(12) United States Patent
Xin et al.

(10) Patent No.: US 11,653,343 B2
(45) Date of Patent: May 16, 2023

(54) SPECTRUM ALLOCATION FOR MULTIPLE RESOURCE UNITS IN A WIRELESS NETWORK

(71) Applicants: Yan Xin, Ottawa (CA); Sheng Sun, Ottawa (CA); Jung Hoon Suh, Ottawa (CA); Osama Aboul-Magd, Ottawa (CA)

(72) Inventors: Yan Xin, Ottawa (CA); Sheng Sun, Ottawa (CA); Jung Hoon Suh, Ottawa (CA); Osama Aboul-Magd, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 17/197,559

(22) Filed: Mar. 10, 2021

(65) Prior Publication Data
US 2021/0289501 A1 Sep. 16, 2021

Related U.S. Application Data

(60) Provisional application No. 62/989,313, filed on Mar. 13, 2020.

(51) Int. Cl.
*H04L 12/28* (2006.01)
*H04W 72/0453* (2023.01)
(Continued)

(52) U.S. Cl.
CPC ....... *H04W 72/0453* (2013.01); *H04W 16/14* (2013.01); *H04W 84/12* (2013.01)

(58) Field of Classification Search
CPC .......................... H04L 1/1614; H04W 16/14; H04W 72/0453; H04W 84/12
(Continued)

(56) References Cited

U.S. PATENT DOCUMENTS

2006/0182017 A1* 8/2006 Hansen ................ H04L 5/0048
370/208
2018/0083793 A1 3/2018 Kim et al.
(Continued)

FOREIGN PATENT DOCUMENTS

| CN | 110234164 A | 9/2019 |
|---|---|---|
| WO | 2011074895 A2 | 6/2011 |
| WO | 2016176550 A1 | 11/2016 |

OTHER PUBLICATIONS

[802.11ax] IEEE Draft Standard for Information Technology—P802.11ax_D6.0., Nov. 2019.
(Continued)

*Primary Examiner* — John Pezzlo

(57) ABSTRACT

Methods, devices and systems for allocating spectrum in a wireless local area network. A bit representation of the availability or unavailability of a plurality of sub-bands of a portion of frequency spectrum is generated and included in a physical layer protocol data unit, which is transmitted to a target station to allocate resource units within the portion of frequency spectrum for use by the target station. The sub-bands may be 20 MHz spectrum sub-bands for large-size resource units, or the portion of frequency spectrum may be a single 20 MHz band sub-divided into multiple sub-bands for allocating small-size resource units. A station that receives the data unit may decode the bit representation and use the allocated resource units to communicate over the wireless local area network.

23 Claims, 23 Drawing Sheets

(51) Int. Cl.
*H04W 16/14* (2009.01)
*H04J 1/16* (2006.01)
*H04W 84/12* (2009.01)

(58) Field of Classification Search
USPC .................................. 370/252, 329, 430
See application file for complete search history.

(56) References Cited

U.S. PATENT DOCUMENTS

| 2020/0022125 | A1* | 1/2020 | Li | H04L 5/0044 |
| 2020/0077421 | A1* | 3/2020 | Asterjadhi | H04L 5/14 |
| 2020/0351668 | A1* | 11/2020 | Kundu | H04L 5/0092 |
| 2021/0250928 | A1* | 8/2021 | Seo | H04W 72/042 |

OTHER PUBLICATIONS

Cariou, Laurent—[802.11 EHT PAR] IEEE 802.11-18/1231r06, 802.11 EHT Proposed PAR, Jan. 11, 2019.
Yang, et al.—[802.11-20/0048] IEEE 802.11-20/0048r0, Large RU Aggregation for 240 and 320 MHz, Jan. 10, 2020.
Liu, et al.—[802.11-19/1907] IEEE 802.11-19/1907r0, Multiple RU Combinations for EHT, Nov. 12, 2019.
Au, Edward—[802.11be SFD] IEEE 802.11-19/1262r8, Specification Framework for TGbe, Feb. 11, 2020.

* cited by examiner

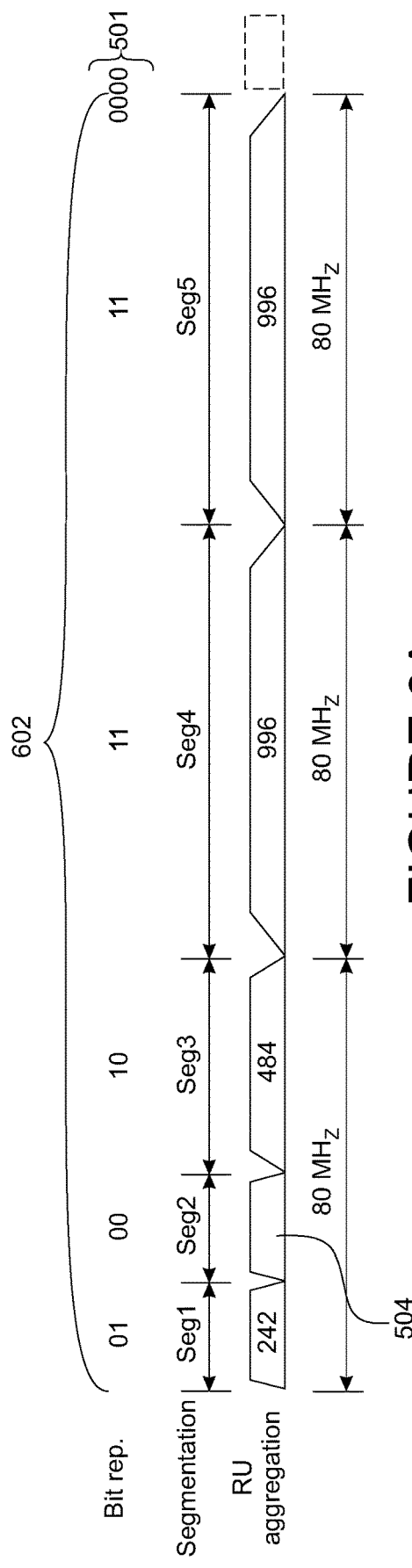
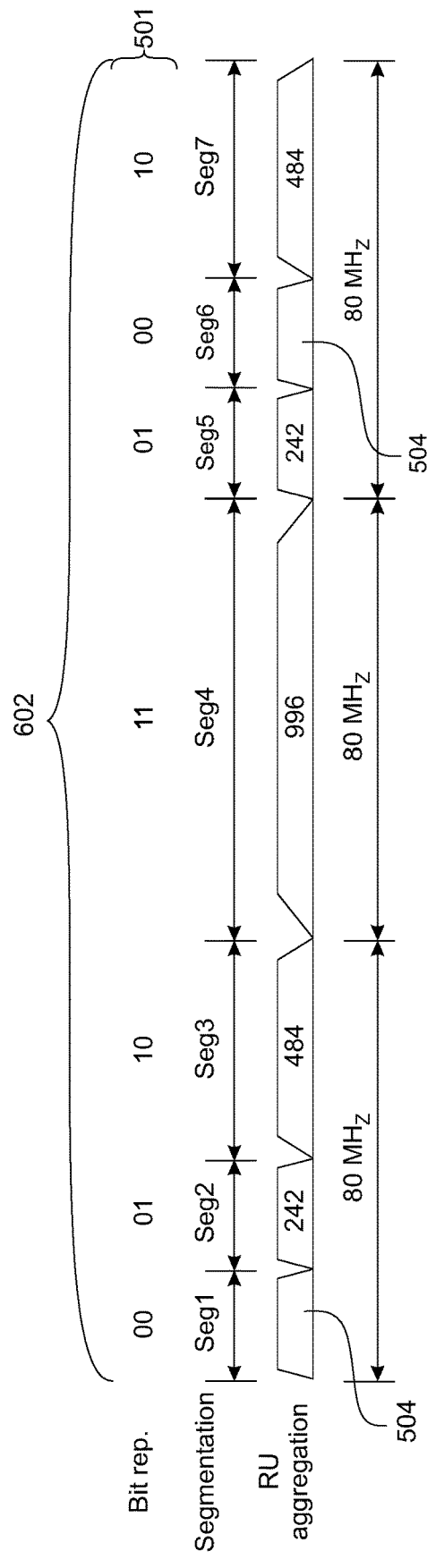
FIGURE 6A
FIGURE 6B

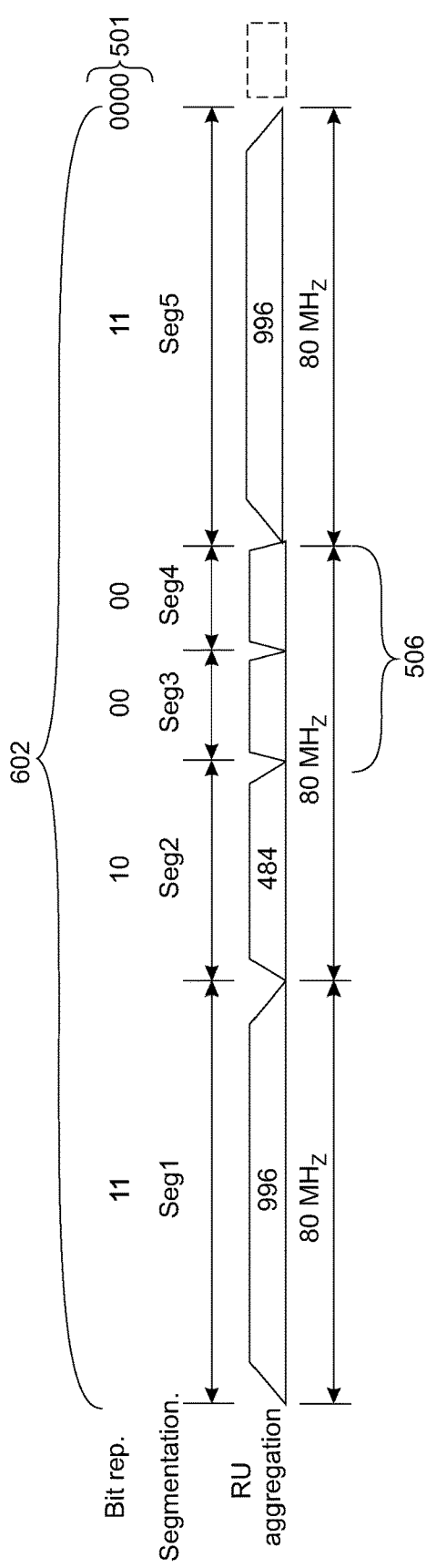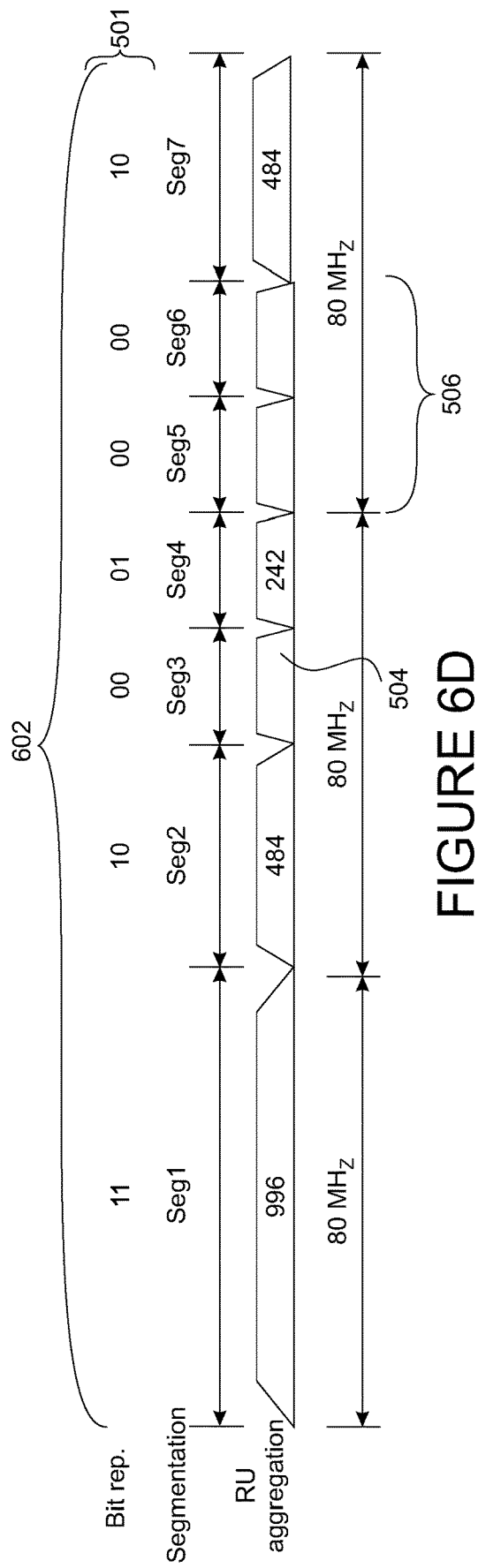

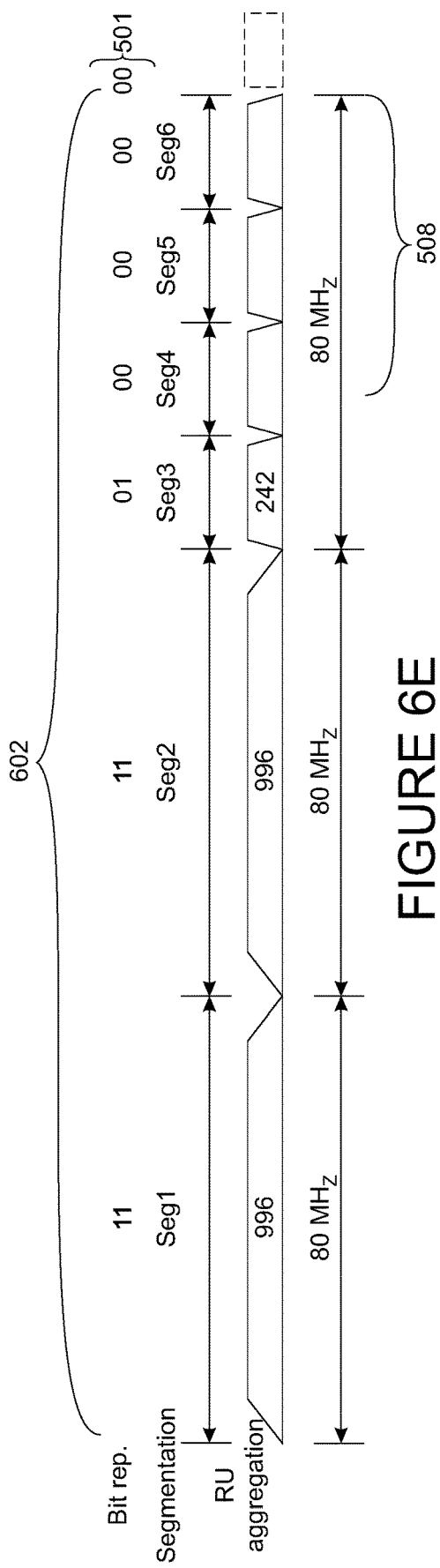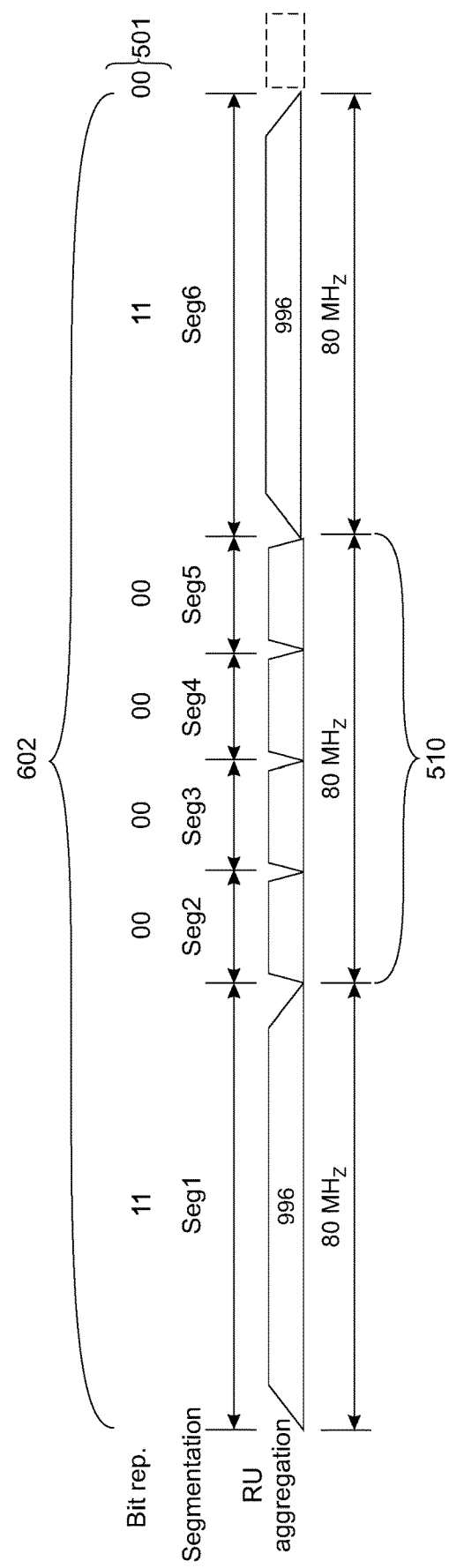

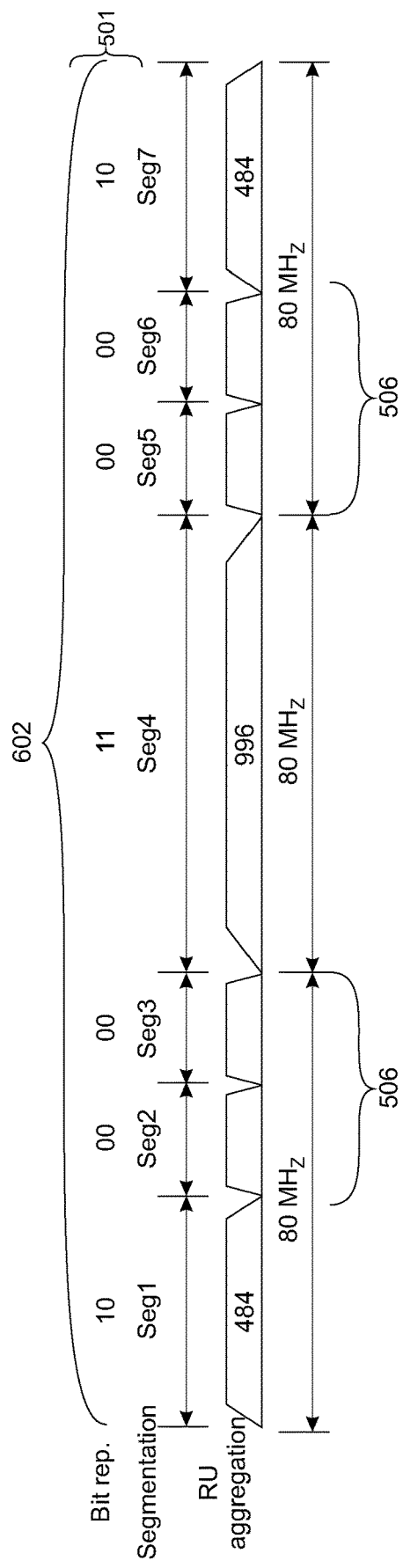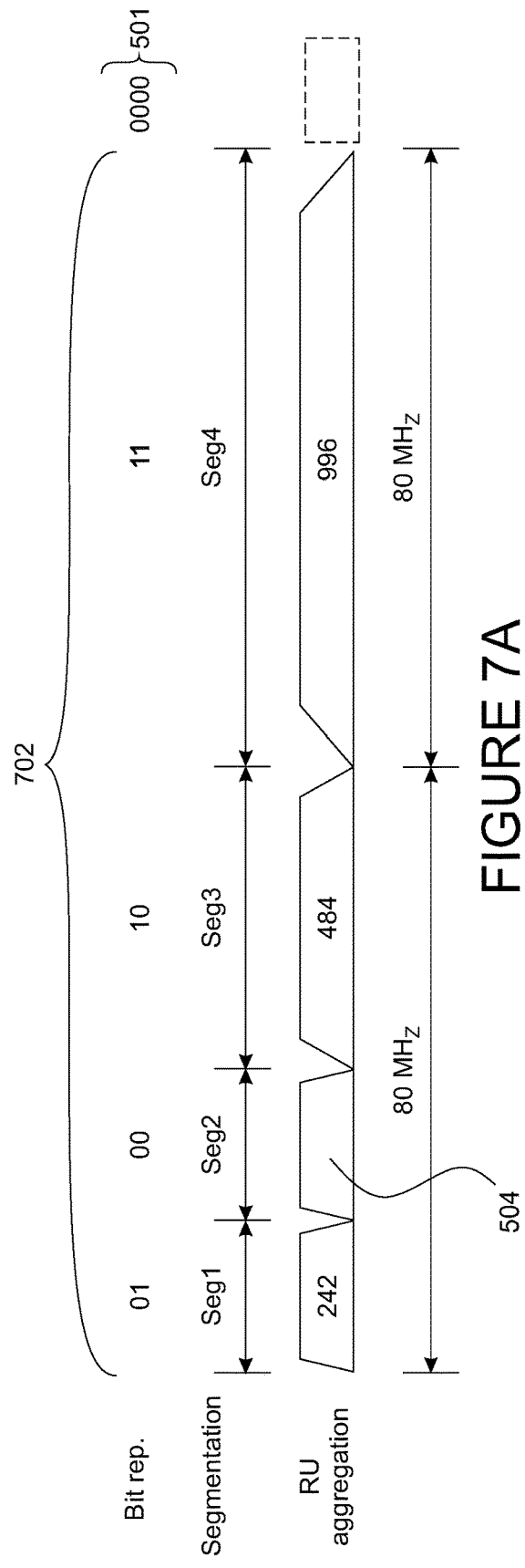

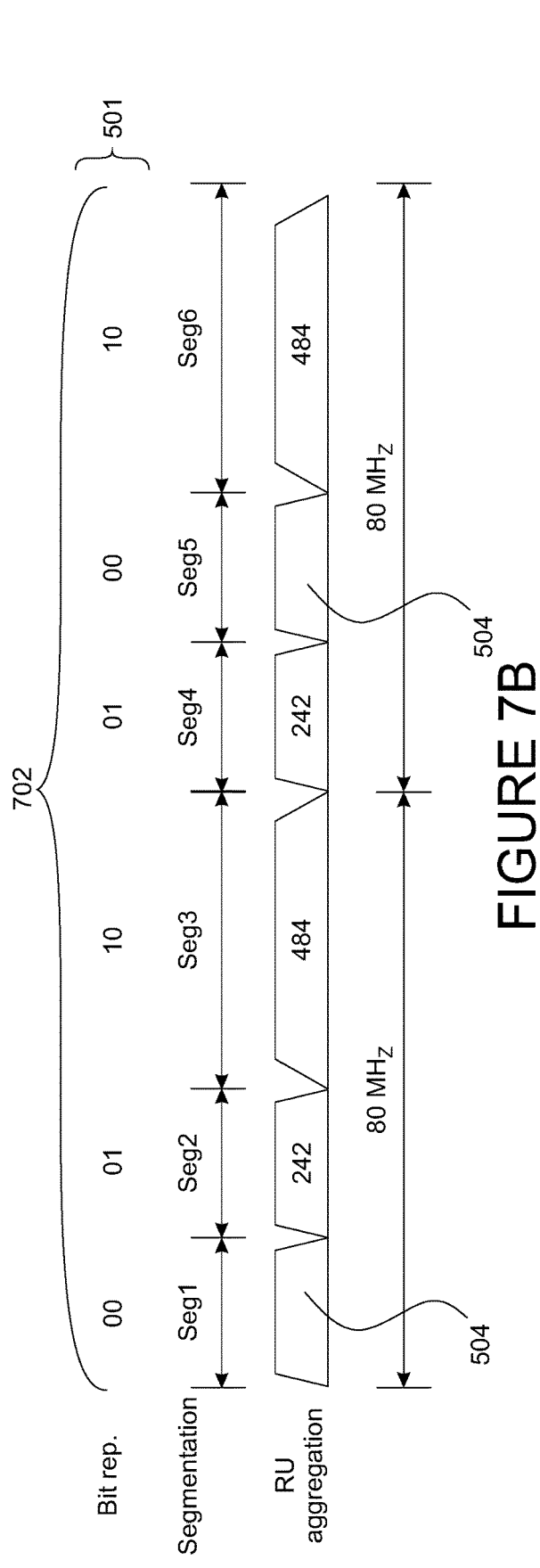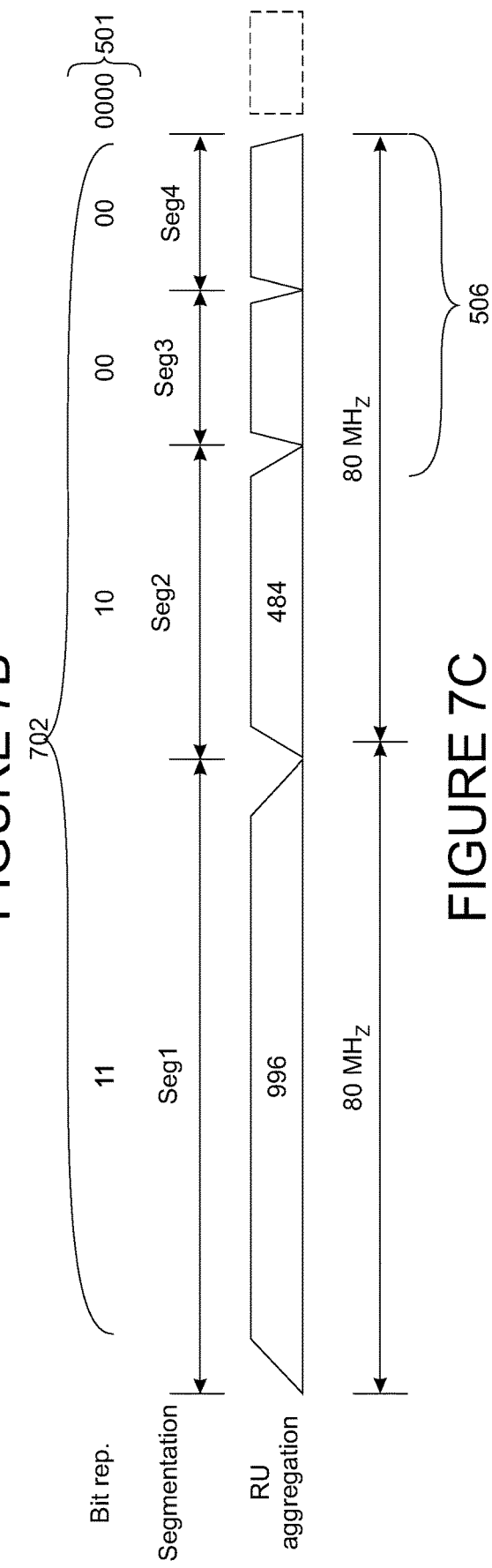

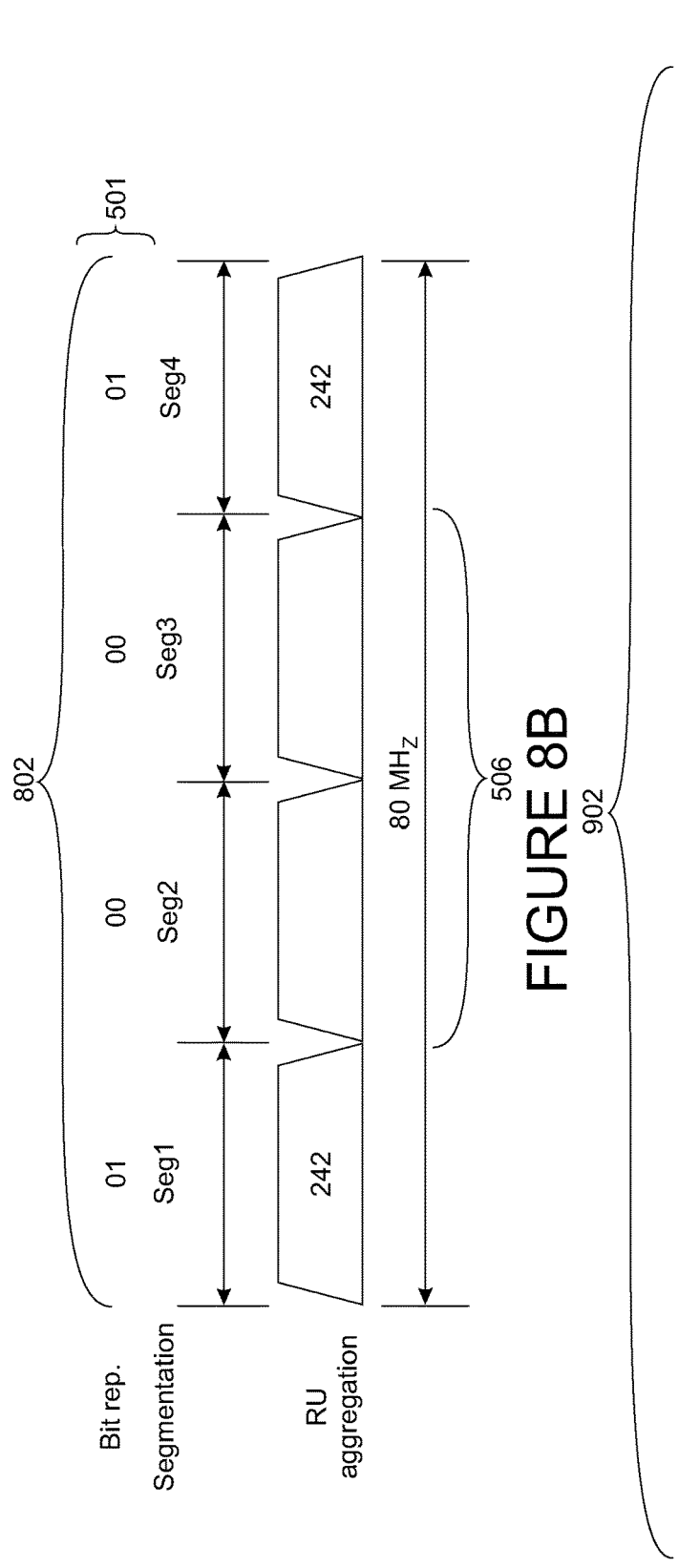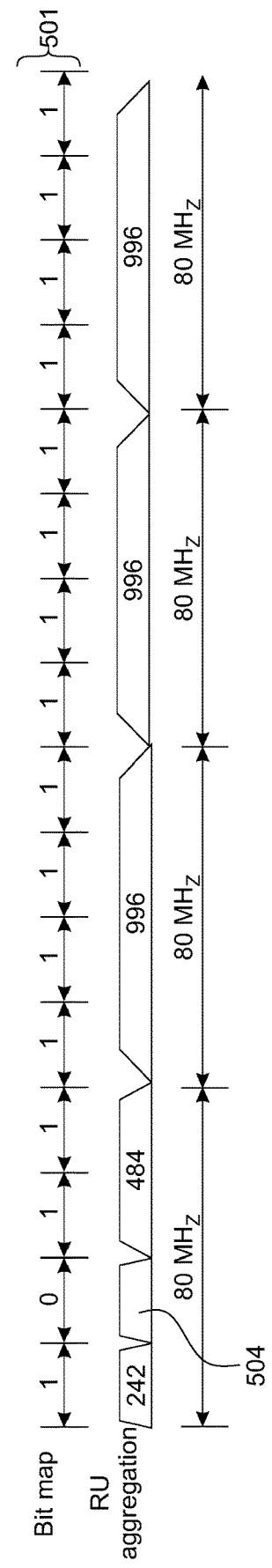

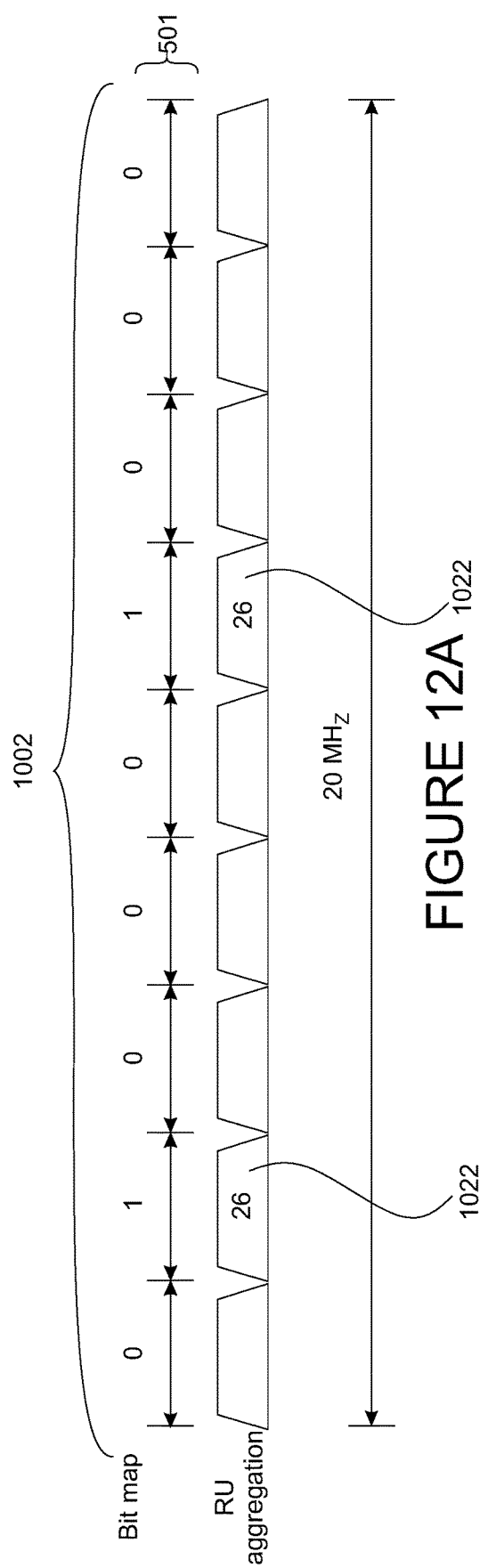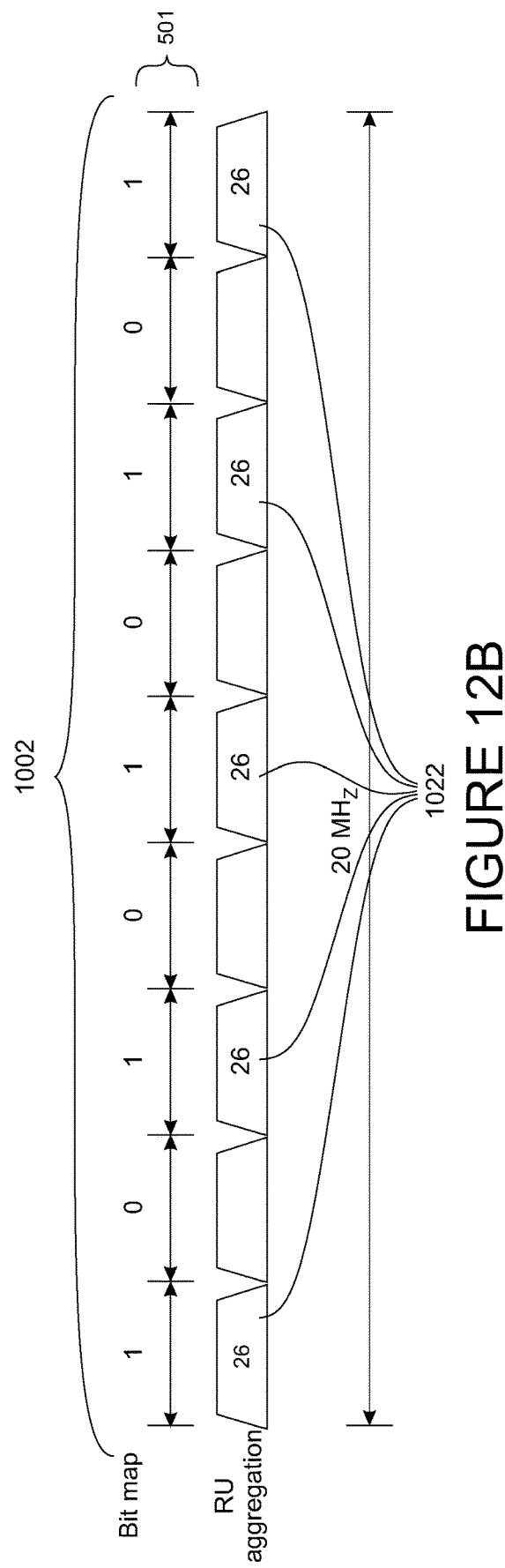

SPECTRUM ALLOCATION FOR MULTIPLE RESOURCE UNITS IN A WIRELESS NETWORK

CROSS REFERENCE

The present application claims the benefit of priority to U.S. Provisional Patent application Ser. No. 62/989,313, entitled "SPECTRUM ALLOCATION FOR MULTIPLE RESOURCE UNITS IN A WIRELESS NETWORK," filed Mar. 13, 2020, the content of which is incorporated herein by reference in its entirety.

TECHNICAL FIELD

The present application relates to mobile air interface technologies, in particular to methods, systems, and devices for allocating spectrum in order to efficiently operate in a wireless network.

BACKGROUND

Networks that operate according to Wi-Fi protocols, including IEEE 802.11 protocols such as IEEE 802.11ax specified in IEEE Draft P802.11ax_D8.0, allocate multiple bands of the radio frequency spectrum for use by different stations at different times.

A new protocol, IEEE 802.11be, is currently under development by IEEE 802.11 Task Group TGbe, and will be the next major IEEE 802.11 amendment to define the next generation of Wi-Fi after IEEE 802.11ax (currently IEEE Draft P802.11ax_D8.0). IEEE 802.11be (also called Extremely High Throughput (EHT)) is expected to support a data rate of at least 30 Gbps and may use a spectrum bandwidth up to 320 MHz for unlicensed operations, double the 160 MHz maximum bandwidth currently contemplated by IEEE 802.11ax.

IEEE 802.11ax supports Orthogonal Frequency-Division Multiple Access (OFDMA) transmission, in which data intended for different stations can be multiplexed within an OFDM symbol through the allocation of different subsets of subcarriers (tones). In IEEE 802.11ax, a Resource Unit (RU) consists of a group of contiguous subcarriers defined in the frequency domain. Different RUs can be assigned to different stations within a PPDU. Each RU is used for one OFDM symbol for one station (also referred to as a STA). FIG. 1 illustrates an example of station (STA) resource allocation in IEEE 802.11ax.

In IEEE 802.11ax, RUs are defined based on RU sizes such as 26-tone RU, 52-tone RU, 106-tone RU, 242-tone RU, 484-tone RU, 996-tone RU and 2×996-tone RU. Information about the RU assigned to a station in a multi-user (MU) configuration, such as the RU location and the RU size, is indicated in the HE-SIG-B field of the physical layer (PHY) protocol data unit (PPDU) in IEEE 802.11ax. Information about the RU assigned to a station in a single-user (SU) configuration, such as the RU location and the RU size, is indicated in the HE-SIG-A field of the physical layer protocol (PHY) data unit (PPDU) in IEEE 802.11ax: in a single-user (SU) configuration, the RU size is uniquely determined by spanning the entire assigned operating channel, i.e., the 242-, 484-, 996- and 2×996-tone RU sizes correspond to 20 MHz, 40 MHz, 80 MHz, and 160 (or 80+80) MHz bandwidths, respectively.

As indicated above, IEEE 802.11be will support a wide bandwidth, up to 320 MHz. The larger bandwidth introduces opportunities and issues that are not present in a narrower bandwidth system. For example, EHT enabled Wi-Fi should enable a significant growth in the volume of high throughput data transmission as well as a proliferation of an extremely large number of low data rate devices such as Internet of Things (IoT) devices. However, as a result of the anticipated deployment density, the probability of a single station having access to a large number of contiguous subcarriers within the 320 MHz bandwidth at any given time can be expected to be low. In this regard, an operating feature called multiple RUs (multi-RU) has been proposed for IEEE 802.11be, in which multiple RUs that each have a respective sub-set of contiguous subcarriers can be allocated for one station in an OFDM symbol.

For the purpose of multi-RU, RUs are divided into two types: "small size" RUs include 26-tone RU, 52-tone RU, and 106-tone RU, whereas "large size" RUs include 242-tone RU, 484-tone RU, 996-tone RU, 2×996-tone RU and 4×996-tone RU. When multiple RUs are allocated for one station, the allocation must be a set of multiple small size RUs or multiple large size RUs: current methods do not support a multi-RU allocation configuration for a station that mixes small size and large size RUs.

FIGS. 2A-2C show the frequency sub-bands denoting RU locations in a HE PPDUs in 802.11ax. FIG. 2A shows a single 242-tone, 20 MHz bandwidth, large-size RU 208 and possible small-size RU combinations that can occupy the same 20 MHz sub-band in place of a 242-tone RU: two 106-tone small-size RUs with a single 26-tone RU in between them (shown as two 13-tone bands) 206; or four 52-tone RUs with a single 26-tone RU in between the second and third 52-tone RU (shown as two 13-tone bands) 204; or eight 26-tone RUs with a single additional 26-tone RU in between the fourth and fifth 26-tone RU (shown as two 13-tone bands) 202. Similarly, FIG. 2B shows a single 484-tone, 40 MHz bandwidth, large-size RU 220 and possible large- or small-size RU combinations that can occupy the same 40 MHz band in place of a 484-tone RU: two 242-tone large-size RUs 218, or two sets of the same small-size RU combinations shown in FIG. 2A. Finally, FIG. 2C shows a single 996-tone, 80 MHz bandwidth, large-size RU 232 and possible large- or small-size RU combinations that can occupy the same 80 MHz band in place of a 996-tone RU: two 484-tone large-size RUs 230, or two sets of the same large- or small-size RU combinations shown in FIG. 2B.

Allocation of small-size or large-size resource units within a portion of frequency spectrum should ideally handle a large number of combinations of RU sizes and unavailable spectrum bands, without using an overly complex bit sequence to encode the resource unit allocation configuration. However, existing proposals for allocation configuration encoding schemes are either overly complex (requiring a large number of entries in a mapping table for indexing) or omit many useful allocation configurations.

SUMMARY

According to a first example aspect, a method of allocating a portion of frequency spectrum in a wireless local area network is provided. A plurality of equal-size sub-bands are identified, making up the portion of frequency spectrum. One or more of the plurality of sub-bands are identified as available. A bit representation is generated, representing an allocation of resource units within the portion of frequency spectrum for use by a target station. The bit representation consists of a plurality of binary values. Each binary value indicates the availability or unavailability of one or more sub-bands. A physical layer protocol data unit (PPDU) is generated. The PPDU comprises a header. The header comprises the bit representation. The PPDU is transmitted to a target station.

According to a second example aspect, a method for communicating over a wireless local area network is provided. A PPDU is received over a wireless local area network. The PPDU comprises a header. The header comprises a bit representation. An allocation of resource units within a portion of frequency spectrum is identified based on the bit representation. The bit representation consists of a plurality of binary values. Each binary value indicates the availability or unavailability of one or more sub-bands of a plurality of equal-size sub-bands making up the portion of frequency spectrum. Each resource unit corresponds to one or more of the identified available sub-bands. One or more of the resource units are used to communicate over the wireless local area network.

In some examples, the portion of frequency spectrum being allocated is an operating channel, each sub-band has a bandwidth of 20 MHz, and each binary value indicates an unavailable sub-band or an available one or more sub-bands capable of supporting a single-user large-size resource unit.

In some examples, the operating channel consists of one to four sub-blocks of the operating channel, each sub-block of the operating channel consisting of four contiguous 20 MHz sub-bands, and the bit representation consists of, for each sub-block of the operating channel, a corresponding sub-block representation, each sub-block representation consisting of one or more binary values.

In some examples, each binary value is two bits, and each binary value corresponds to an unavailable 20 MHz sub-band or the size of an available one or more contiguous 20 MHz sub-bands.

In some examples, the four possible binary values correspond to: an unavailable sub-band, an available sub-band, two contiguous available sub-bands, and four contiguous available sub-bands.

In some examples, each binary value is one bit, and each binary value corresponds to an unavailable 20 MHz sub-band or an available 20 MHz sub-band.

In some examples, the portion of frequency spectrum being allocated is a 20 MHz band having nine sub-bands, each binary value is one bit, and each binary value corresponds to an unavailable sub-band or an available sub-band.

In some examples, the fifth sub-band in order by frequency is not available for allocation, and the bit representation has eight bits.

In some examples, the header includes a universal signal field, and the bit representation is included in the universal signal field.

In some examples, the header includes an extreme high throughput signal field, and the bit representation is included in the extreme high throughput signal field.

According to further example aspects, a station is provided. The station is enabled for use in a wireless area local area network (WLAN), the station being configured to perform one or more of the above methods.

According to further example aspects, a processing system is provided. The processing system comprises a processing device, a wireless network interface for wireless communication with a network, and a memory. The memory has stored thereon executable instructions that, when executed by the processing device, implement a communication module configured to perform one or more of the above methods using the wireless network interface.

BRIEF DESCRIPTION OF THE DRAWINGS

Reference will now be made, by way of example, to the accompanying figures which show example embodiments of the present application, and in which:

FIG. 6A illustrates an RU allocation configuration of a 240 MHz operating channel including a single unavailable 20 MHz sub-band in accordance with the first embodiment of the present disclosure.

FIG. 6B illustrates an RU allocation configuration of a 240 MHz operating channel including two unavailable 20 MHz sub-bands in accordance with the first embodiment of the present disclosure.

FIG. 6C illustrates an RU allocation configuration of a 240 MHz operating channel including one unavailable 40 MHz sub-band in accordance with the first embodiment of the present disclosure.

FIG. 6D illustrates an RU allocation configuration of a 240 MHz operating channel including one unavailable 20

MHz sub-band and one unavailable 40 MHz sub-band in accordance with the first embodiment of the present disclosure.

FIG. 6E illustrates an RU allocation configuration of a 240 MHz operating channel including one unavailable 60 MHz sub-band in accordance with the first embodiment of the present disclosure.

FIG. 6F illustrates an RU allocation configuration of a 240 MHz operating channel including one unavailable 80 MHz sub-band in accordance with the first embodiment of the present disclosure.

FIG. 6G illustrates an RU allocation configuration of a 240 MHz operating channel including two unavailable 40 MHz sub-bands in accordance with the first embodiment of the present disclosure.

FIG. 7A illustrates an RU allocation configuration of a 160 MHz operating channel including a single unavailable 20 MHz sub-band in accordance with the first embodiment of the present disclosure.

FIG. 7B illustrates an RU allocation configuration of a 160 MHz operating channel including two unavailable 20 MHz sub-bands in accordance with the first embodiment of the present disclosure.

FIG. 7C illustrates an RU allocation configuration of a 160 MHz operating channel including one unavailable 40 MHz sub-band in accordance with the first embodiment of the present disclosure.

Figure 7D:
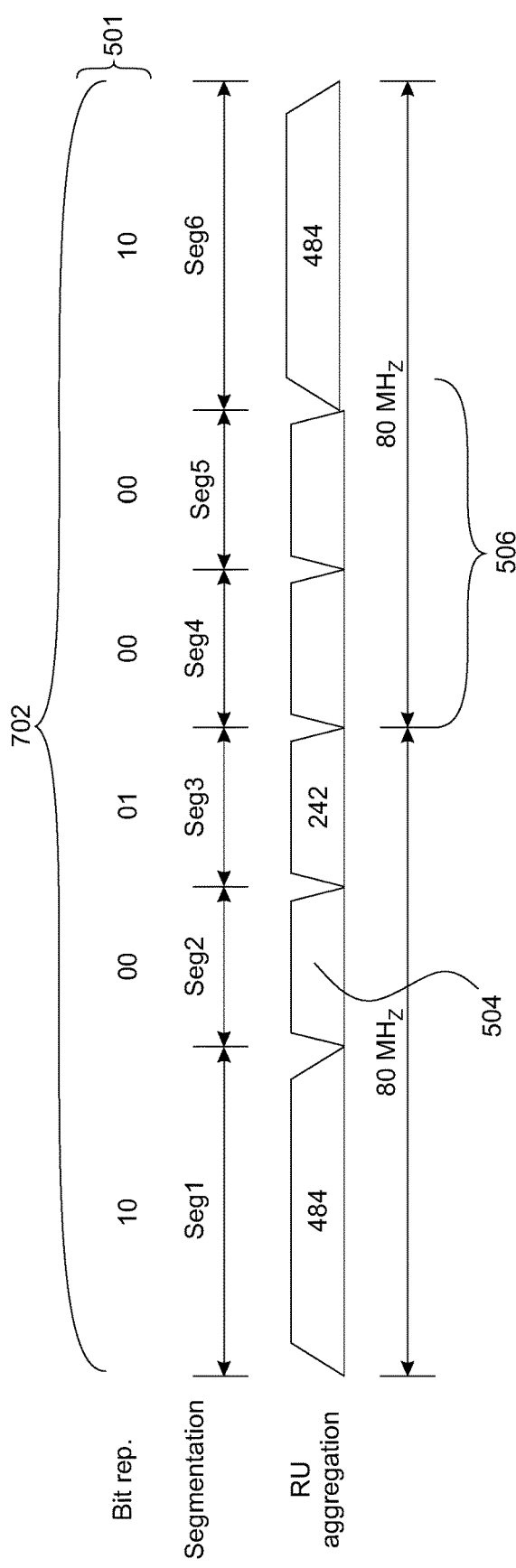

FIG. 7D illustrates an RU allocation configuration of a 160 MHz operating channel including one unavailable 20 MHz sub-band and one unavailable 40 MHz sub-band in accordance with the first embodiment of the present disclosure.

Figure 7E:
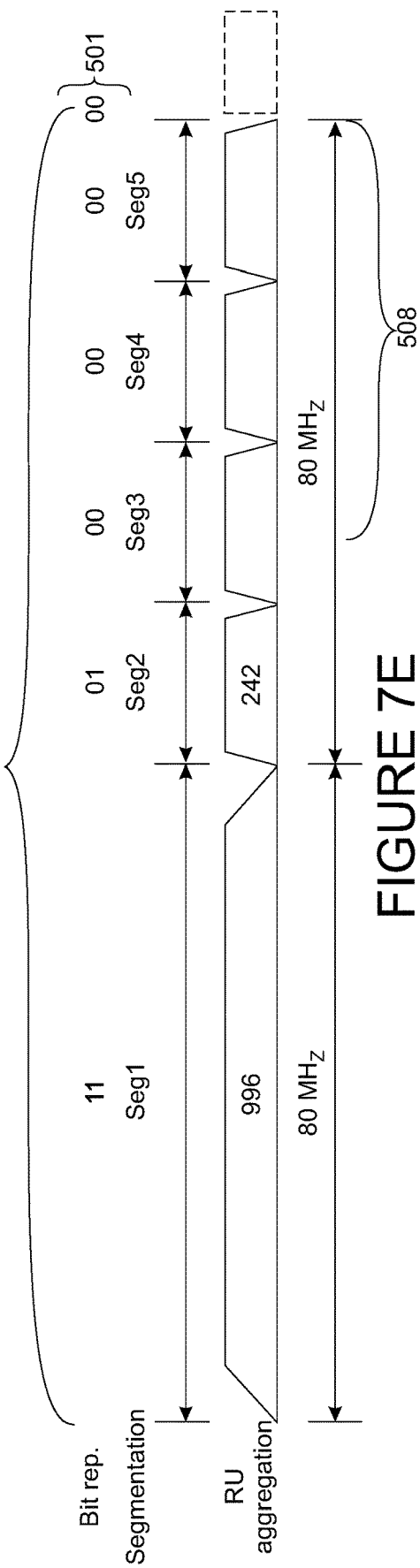

FIG. 7E illustrates an RU allocation configuration of a 160 MHz operating channel including one unavailable 60 MHz sub-band in accordance with the first embodiment of the present disclosure.

Figure 7F:
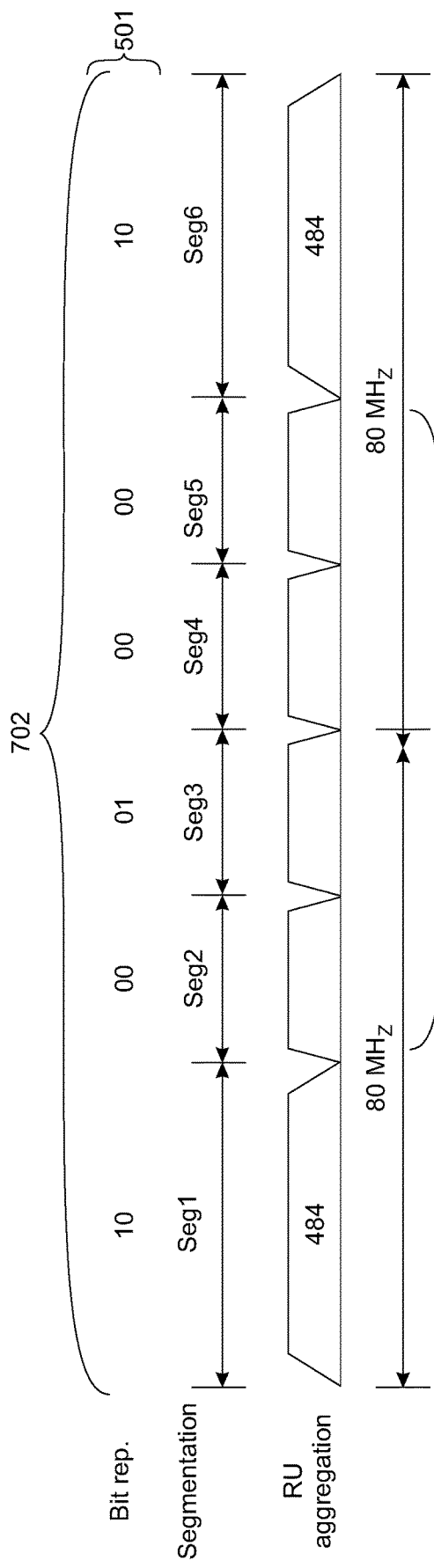

FIG. 7F illustrates an RU allocation configuration of a 160 MHz operating channel including two unavailable 40 MHz sub-bands in accordance with the first embodiment of the present disclosure.

Figure 8A:
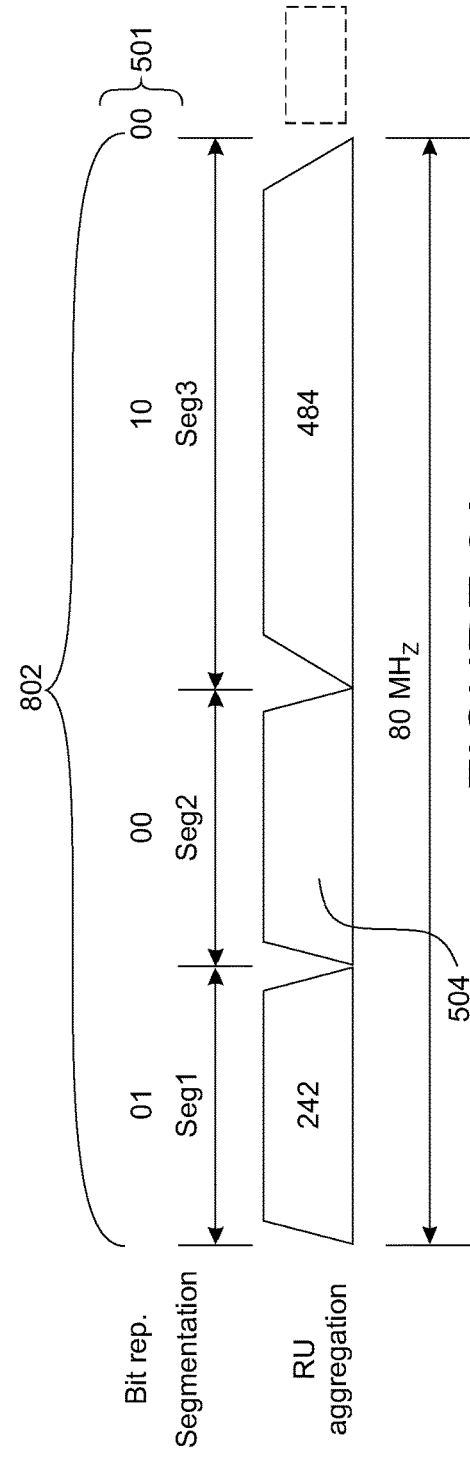

FIG. 8A illustrates an RU allocation configuration of an 80 MHz operating channel including a single unavailable 20 MHz sub-band in accordance with the first embodiment of the present disclosure.

FIG. 8B illustrates an RU allocation configuration of an 80 MHz operating channel including two unavailable 20 MHz sub-bands in accordance with the first embodiment of the present disclosure.

FIG. 9A illustrates an RU allocation configuration of a 320 MHz operating channel including a single unavailable 20 MHz sub-band in accordance with a second embodiment of the present disclosure.

Figure 9B:
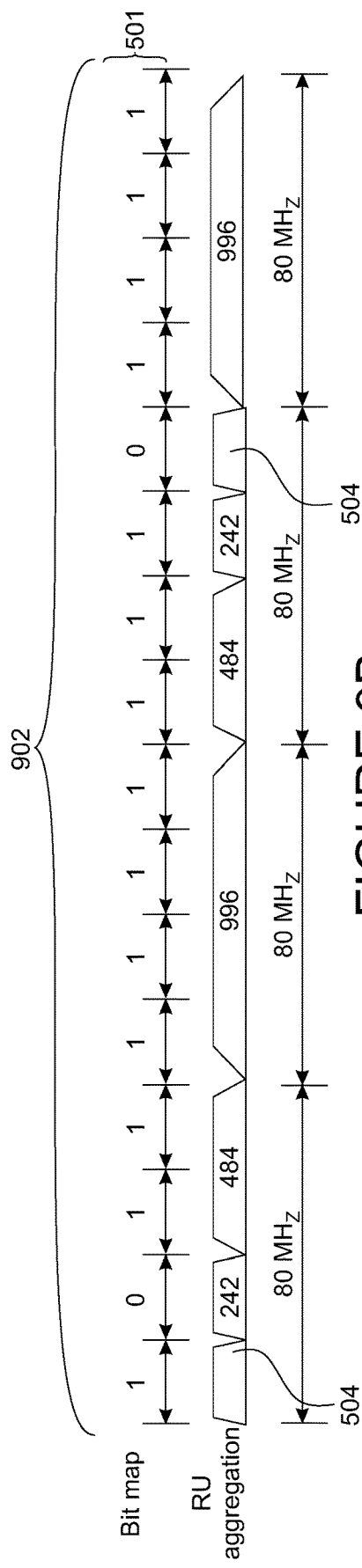

FIG. 9B illustrates an RU allocation configuration of a 320 MHz operating channel including two unavailable 20 MHz sub-bands in accordance with the second embodiment of the present disclosure.

Figure 10:
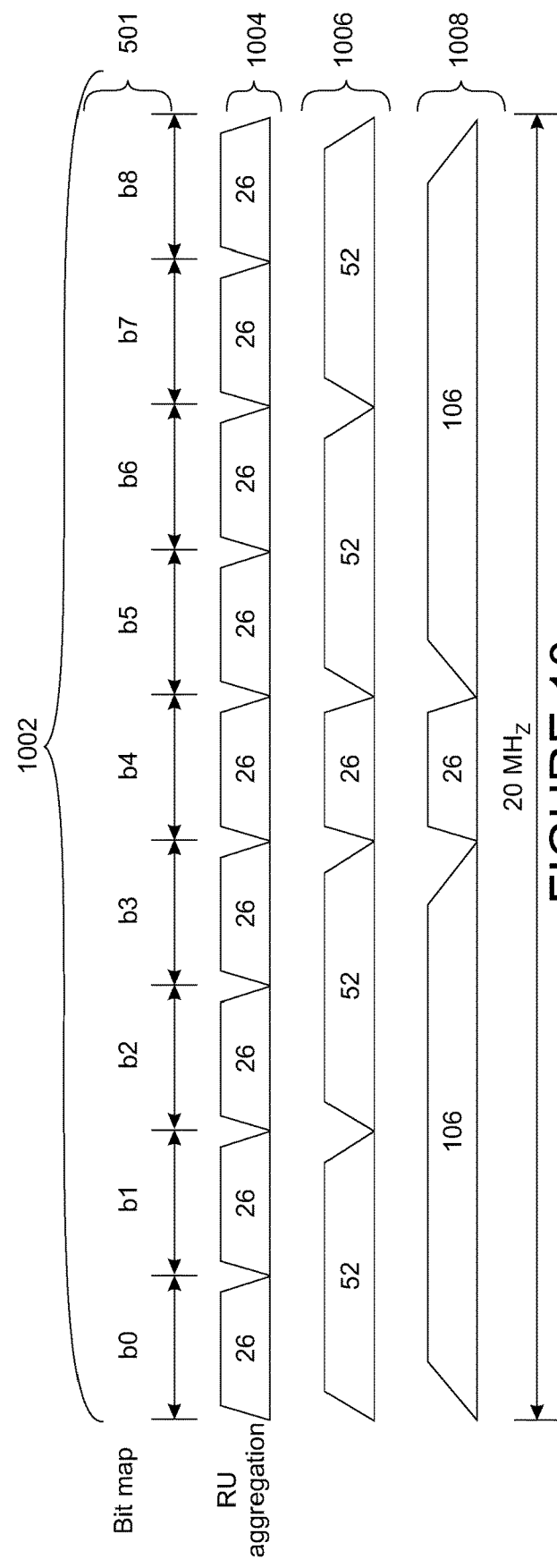

FIG. 10 illustrates several example RU sizes and corresponding allocation bit representations for small-size resource units of a 20 MHz band in accordance with a first aspect of a third embodiment of the present disclosure.

Figure 11:
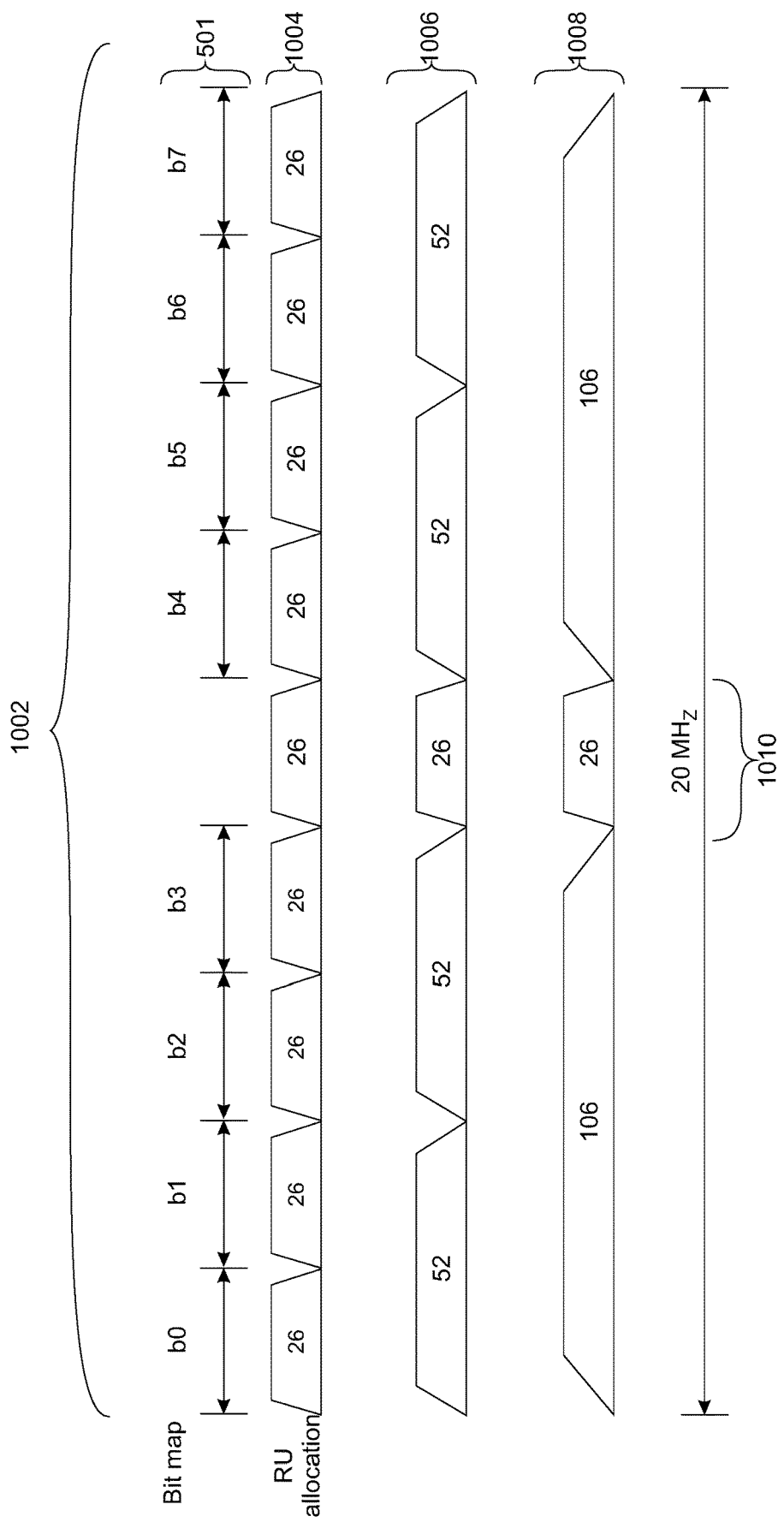

FIG. 11 illustrates several example RU sizes and corresponding allocation bit representations for small-size resource units of a 20 MHz band in accordance with a second aspect of the third embodiment of the present disclosure.

FIG. 12A illustrates an RU allocation configuration for small-size resource units of a 20 MHz band including two available 26-tone resource units in accordance the third embodiment of the present disclosure.

FIG. 12B illustrates an RU allocation configuration for small-size resource units of a 20 MHz band including five available 26-tone resource units in accordance the third embodiment of the present disclosure.

Figure 12C:
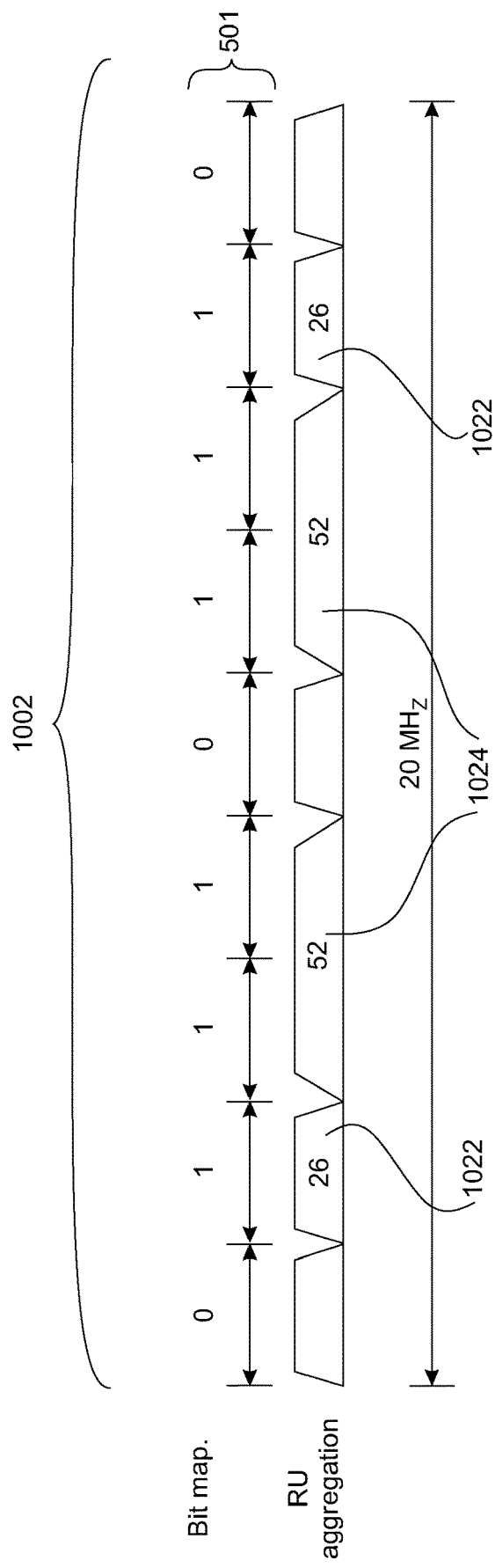

FIG. 12C illustrates an RU allocation configuration for small-size resource units of a 20 MHz band including two available 26-tone resource units and two available 52-tone resource units in accordance the third embodiment of the present disclosure.

Figure 12D:
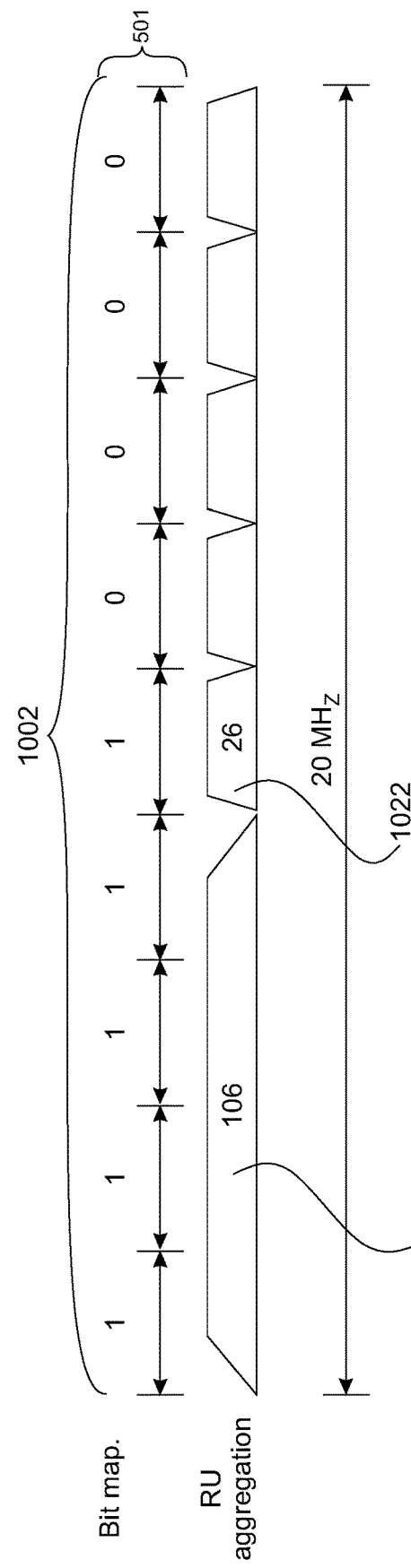

FIG. 12D illustrates an RU allocation configuration for small-size resource units of a 20 MHz band including one available 26-tone resource unit and one available 106-tone resource unit in accordance the third embodiment of the present disclosure.

Figure 12E:
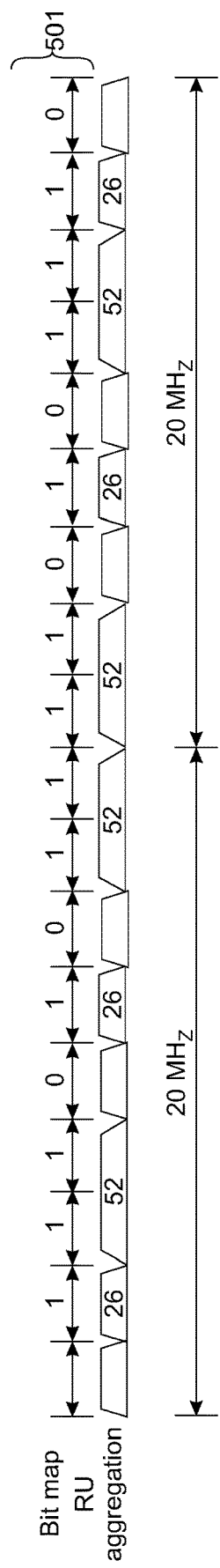

FIG. 12E illustrates an RU allocation configuration for small-size resource units of a 40 MHz band including four available 26-tone resource units and four available 52-tone resource units in accordance the third embodiment of the present disclosure.

Figure 4:
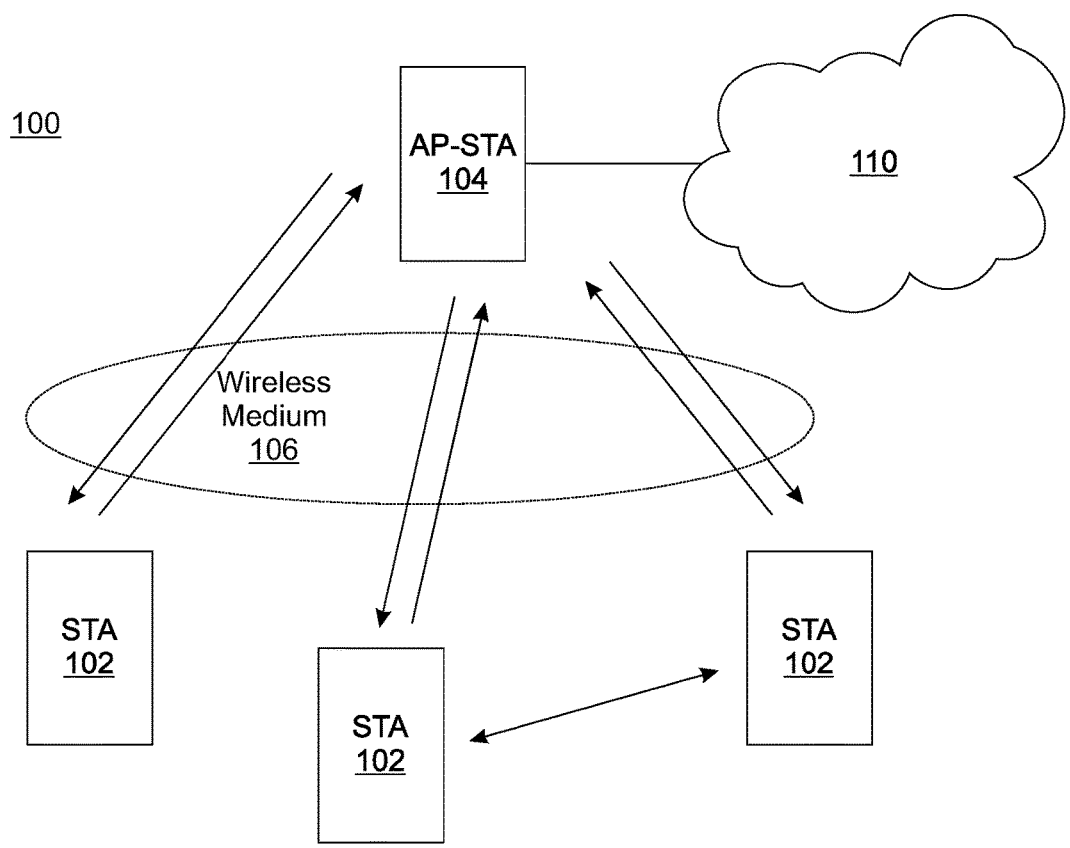
FIG. 4 is a block diagram illustrating an example communication network in accordance with one implementation of the present disclosure.
Figure 13:
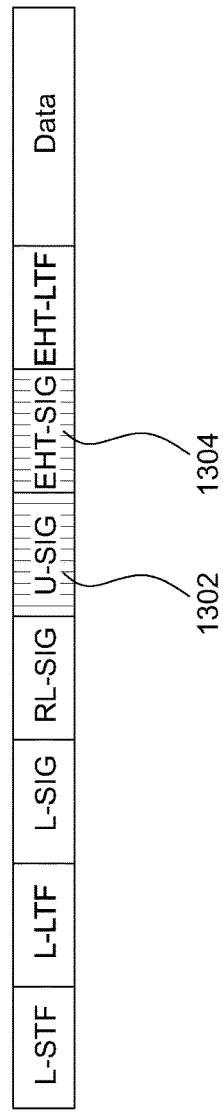

FIG. 13 illustrates an example physical layer protocol data packet format for exchanging information through a wireless medium of the communication network of FIG. 4.

Figure 14:
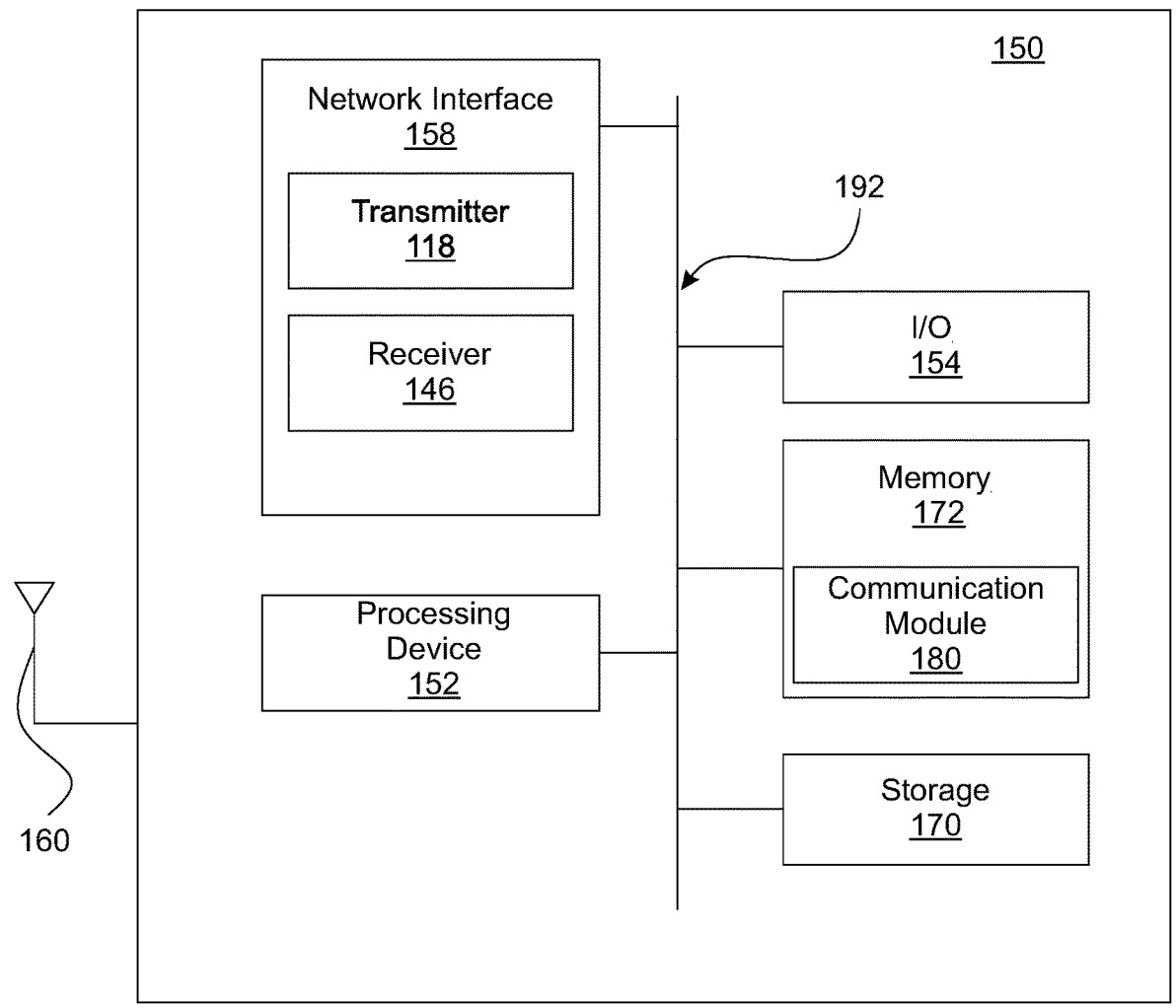

FIG. 14 is a block diagram illustrating a processing system which may be used in one or more stations of the communication network of FIG. 4 according to example embodiments.

Figure 15:
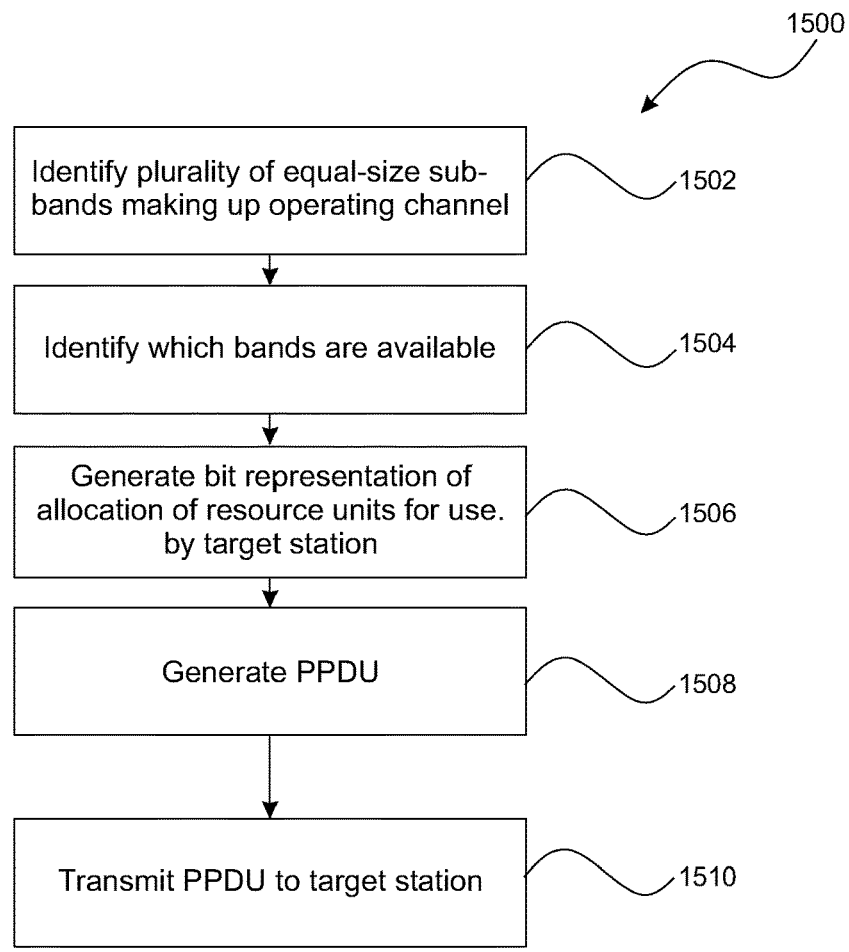

FIG. 15 is a flowchart showing steps of a method of allocating resource units according to example embodiments.

Figure 16:
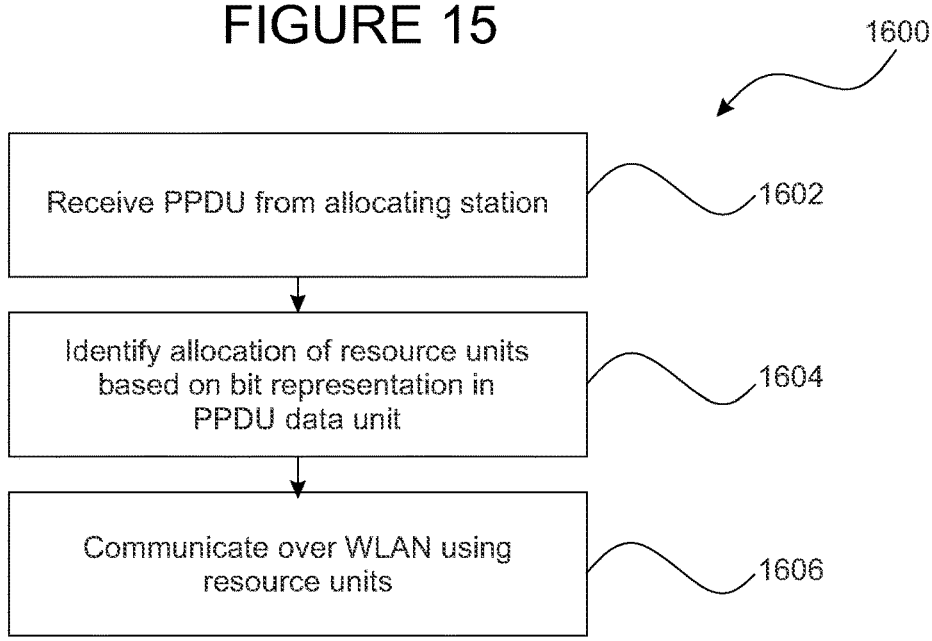

FIG. 16 is a flowchart showing steps of a method of receiving resource unit allocation information for communicating on a wireless network according to example embodiments.

Like reference numerals are used throughout the Figures to denote similar elements and features. Although aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods, devices, and systems for allocating spectrum in order to efficiently operate in a wireless network. Next generation wireless local area network (WLAN) systems, including for example next generation Wi-Fi systems such as the EHT system proposed under the developing IEEE 802.11be protocol, will have access to larger bandwidth. As noted above, a multi-RU feature has been proposed for IEEE 802. However, also as noted above, existing proposals for allocation configuration encoding schemes are either overly complex (requiring a large number of entries in a mapping table for indexing) or omit many useful allocation configurations.

Methods, devices, and processing systems are disclosed for encoding single-user (SU), multi-resource units (multi-RU) allocations in a wireless network. The embodiments described herein pertain to three distinct multi-RU encoding methods, and to devices and processing systems for performing those methods. Each of the described embodiments may have certain advantages over existing proposals for multi-RU encoding in 802.11be or other wireless communication technologies, including low complexity (i.e. easy implementation using the bit representation of a multi-RU allocation) and/or enabling certain allocation configurations not enabled by other proposed encodings.

Figure 1:
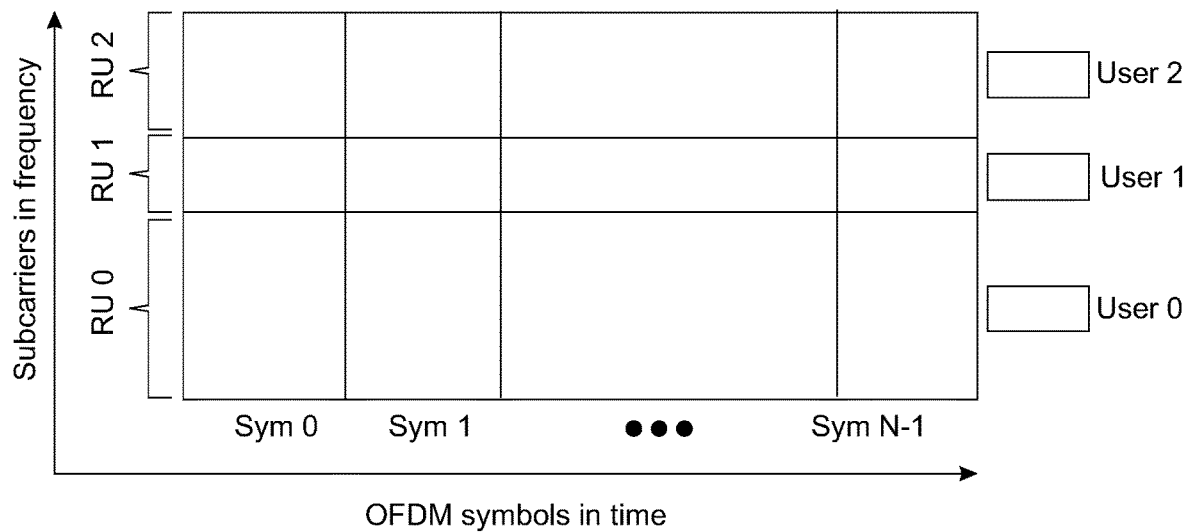
FIG. 1 (prior art) illustrates an example of station (STA) resource allocation in 802.11ax.
Figure 2A:
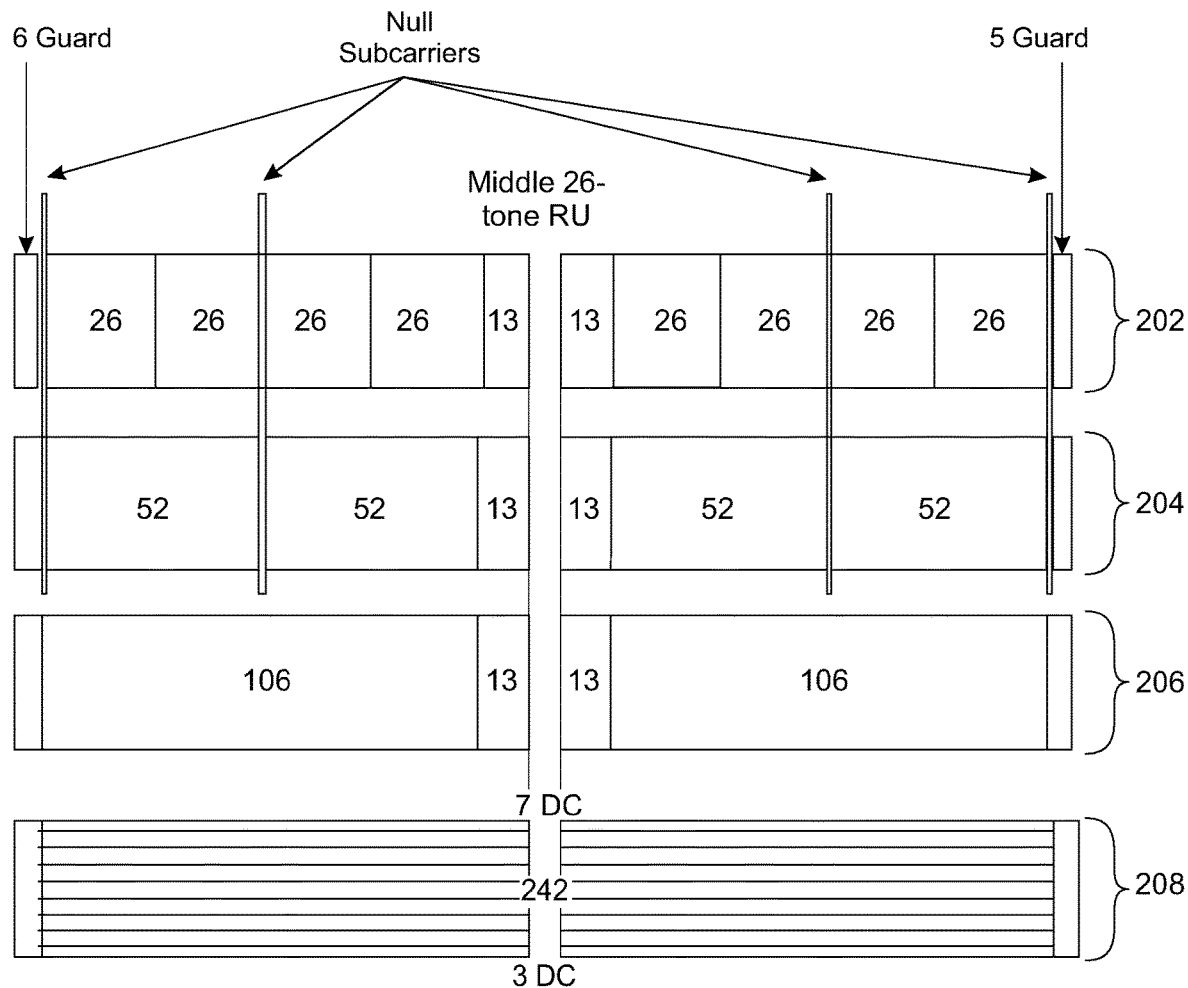
FIG. 2A (prior art) illustrates the frequency bands denoting possible RU locations within a 20 MHz frequency band in a HE PPDU in 802.11ax.
Figure 2B:
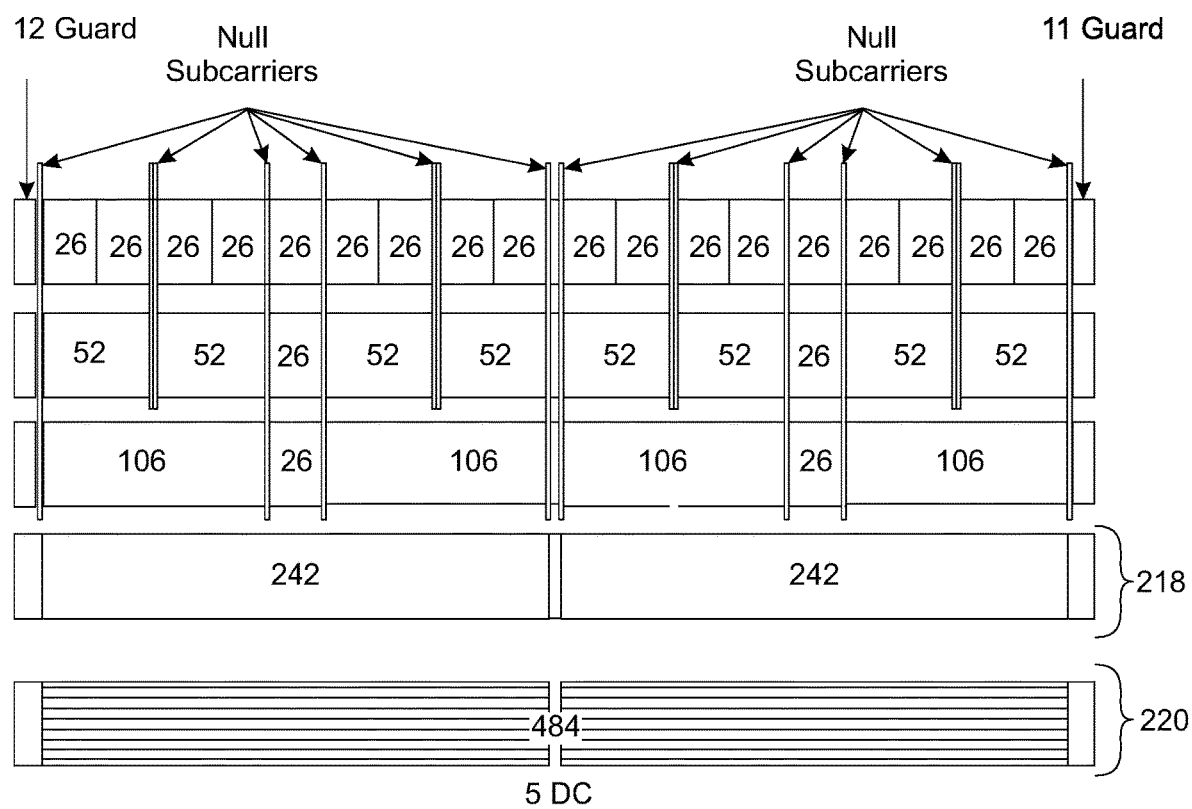
FIG. 2B (prior art) illustrates the frequency bands denoting possible RU locations within a 40 MHz frequency band in a HE PPDU in 802.11ax.
Figure 2C:
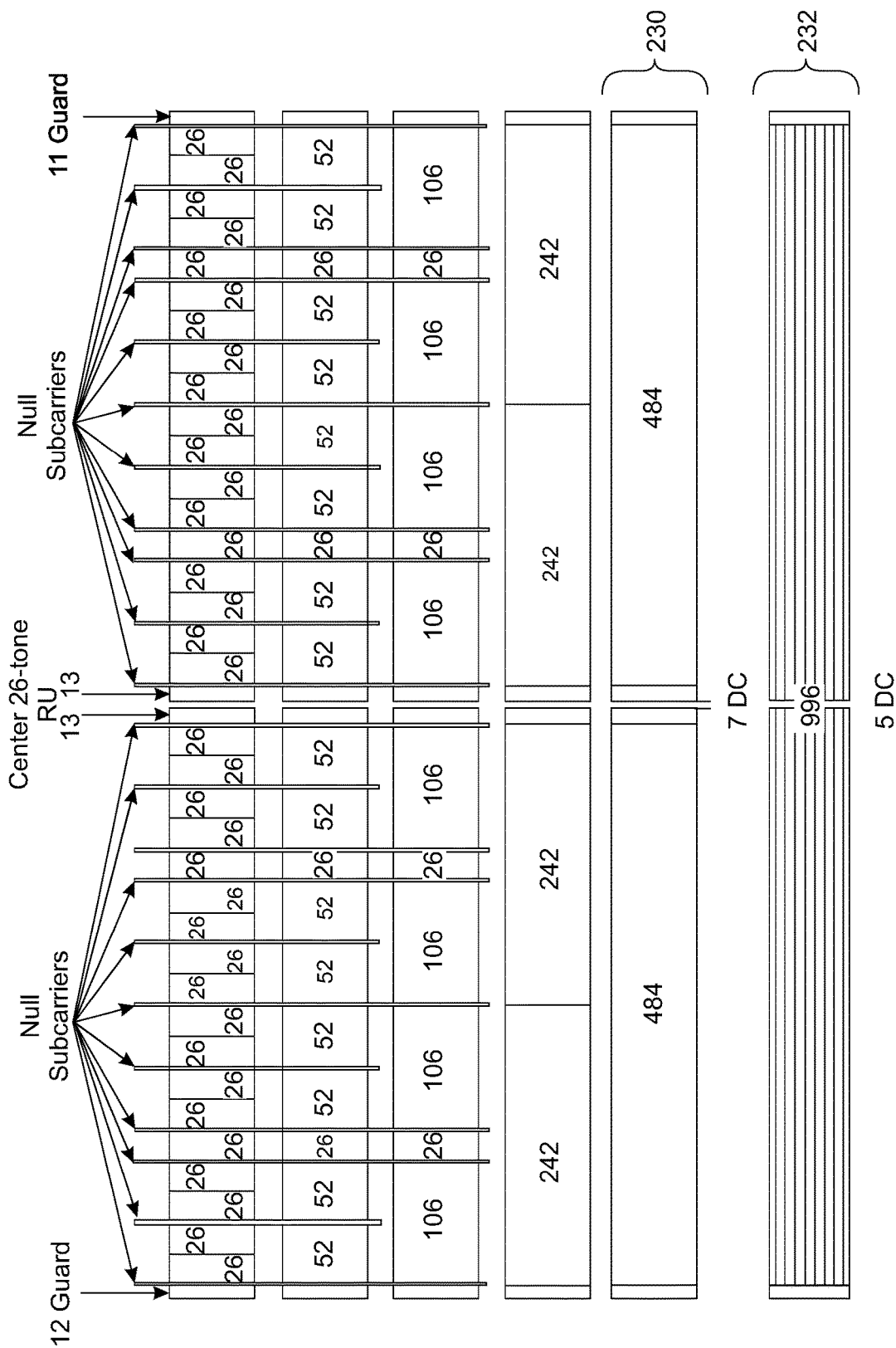
FIG. 2C (prior art) illustrates the frequency bands denoting possible RU locations within an 80 MHz frequency band in a HE PPDU in 802.11ax.
Figure 3:
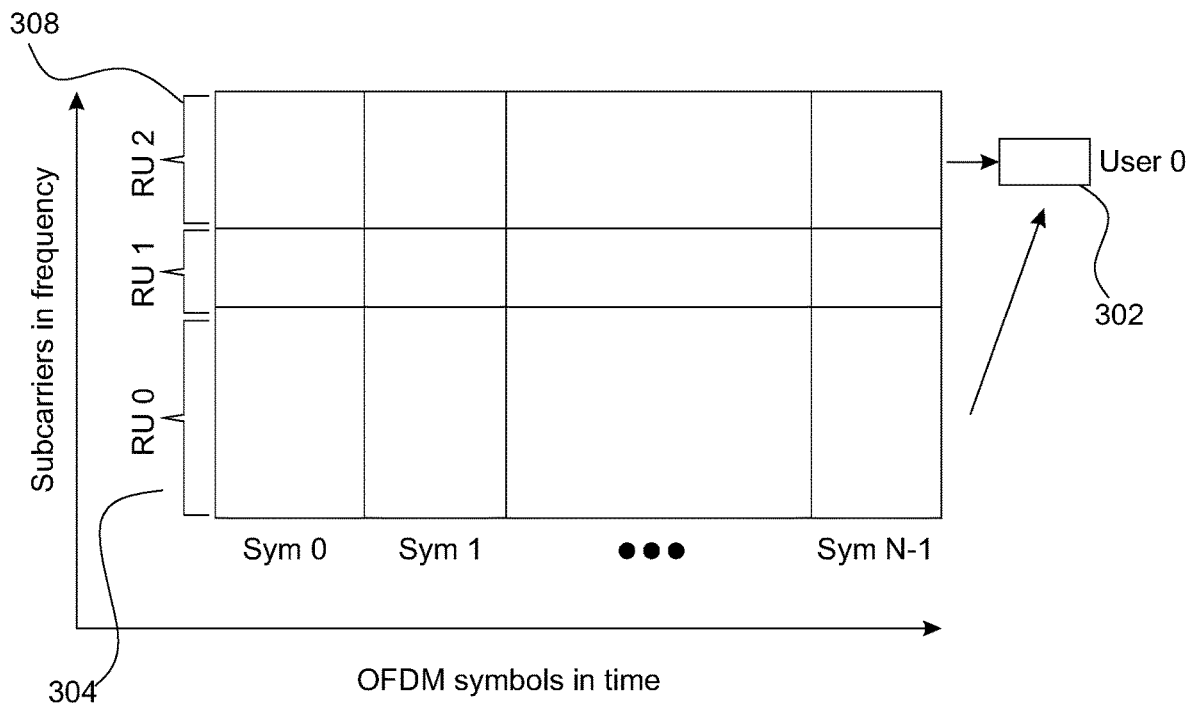
FIG. 3 shows an example of multiple RUs allocated to one station according to an example embodiment.

FIG. 3 illustrates a representative example of multiple RUs assigned to a single target station 302 according to example embodiments. In the example of FIG. 3, the target station 302 has been assigned two non-contiguous RUs, namely RU 0 304 and RU 2 308, in each of a plurality of OFDM symbols Sym 0 to Sym N−1 within a PPDU.

Example Network

An example of an environment in which multi-RU allocation can occur is illustrated in FIG. 4. FIG. 4 illustrates a communication network 100 comprising a plurality of stations (STAs) that can include fixed, portable, and moving stations. The example of FIG. 4 illustrates a single fixed STA, access-point station (AP-STA) 104, and a plurality of STAs 102 that may be portable or mobile. The network 100 may operate according to one or more communications or data standards or technologies, however in at least some examples the network 100 is a WLAN, and in at least some examples is a next generation Wi-Fi compliant network that operates in accordance with one or more protocols from the 802.11 family of protocols.

Each STA 102 may be a laptop, desktop PC, PDA, Wi-Fi phone, wireless transmit/receive unit (WTRU), mobile station (MS), mobile terminal, smartphone, mobile telephone, sensor, internet of things (IOT) device, or other wireless enabled computing or mobile device. In some embodiments, a STA 102 comprises a machine which has the capability to send, receive, or send and receive data in the communications network 100 but which performs primary functions other than communications. The AP-STA 104 may comprise a network access interface which functions as a wireless transmission and/or reception point for STAs 102 in the network 100. The AP-STA 104 may be connected to a backhaul network 110 which enables data to be exchanged between the AP-STA 104 and other remote networks (including for example the Internet), nodes, APs, and devices (not shown). The AP-STA 104 may support communications through unlicensed radio frequency spectrum wireless medium 106 with each STA 102 by establishing uplink and downlink communication links or channels with each STA 102, as represented by the arrows in FIG. 4. In some examples, STAs 102 may be configured to communicate with each other. Communications in the network 100 may be unscheduled, scheduled by the AP-STA 104 or by a scheduling or management entity (not shown) in the network 100, or a mix of scheduled and unscheduled communications.

In some embodiments, the AP-STA 104 is configured to perform one or more of the RU allocation transmission methods described herein. In some embodiments, one or more of the STAs 102 or the AP-STA 104 are configured to perform one or more of the RU allocation reception methods described herein.

Example Processing System

In some embodiments, a processing system may be used to perform one or more steps of the methods described herein. With reference to FIG. 14, an example processing system 150 is shown which may be used to implement methods and systems described herein, such as the STA 102 or the AP-STA 104. Other processing systems suitable for implementing the methods and systems described in the present disclosure may be used, which may include components different from those discussed below. Although FIG. 14 shows a single instance of each component, there may be multiple instances of each component in the processing system 150.

The processing system 150 may include one or more processing devices 152, such as a processor, a microprocessor, an application-specific integrated circuit (ASIC), a field-programmable gate array (FPGA), a dedicated logic circuitry, or combinations thereof. The processing system 150 may also include one or more input/output (I/O) interfaces 154, which may enable interfacing with one or more appropriate input devices and/or output devices (not shown). One or more of the input devices and/or output devices may be included as a component of the processing system 150 or may be external to the processing system 150. The processing system 150 may include one or more network interfaces 158 for wired or wireless communication with a network. In example embodiments, network interfaces 158 include one or more wireless interfaces such as transmitter 118 and receiver 146 that enable communications in a WLAN such as network 100. The network interface(s) 158 may include interfaces for wired links (e.g., Ethernet cable) and/or wireless links (e.g., one or more radio frequency links) for intra-network and/or inter-network communications. The network interface(s) 158 may provide wireless communication via one or more transmitters or transmitting antennas, one or more receivers or receiving antennas, and various signal processing hardware and software, for example. In this regard, some network interface(s) 158 may include respective processing systems that are similar to processing system 150. In this example, a single antenna 160 is shown, which may serve as both transmitting and receiving antenna. However, in other examples there may be separate antennas for transmitting and receiving. The network interface(s) 158 may be configured for sending and receiving data to the backhaul network 110 or to other STAs, user devices, access points, reception points, transmission points, network nodes, gateways or relays (not shown) in the network 100.

The processing system 150 may also include one or more storage units 170, which may include a mass storage unit such as a solid state drive, a hard disk drive, a magnetic disk drive and/or an optical disk drive. The processing system 150 may include one or more memories 172, which may include a volatile or non-volatile memory (e.g., a flash memory, a random access memory (RAM), and/or a read-only memory (ROM)).

The non-transitory memory(ies) 172 may store instructions for execution by the processing device(s) 152, such as to carry out the method steps and/or implement the systems of the present disclosure. These instructions, when executed by the processing device, may implement a communication module 180 configured to perform the methods described herein using the wireless network interface. The communication module 180 may use other data or instructions stored in the memory(ies) 172, such as network configuration instructions and network status information (not shown).

The memory(ies) 172 may include other software instructions, such as for implementing an operating system and other applications/functions. In some examples, one or more data sets and/or module(s) may be provided by an external memory (e.g., an external drive in wired or wireless communication with the processing system 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 192 providing communication among components of the processing system 150, including the processing device(s) 152, I/O interface(s) 154, network interface(s) 158, storage unit(s) 170, and memory(ies) 172. The bus 192 may be any suitable bus architecture including, for example, a memory bus, a peripheral bus or a video bus.

The transmitter 118 receives as input a serial stream of data bits to be transmitted. In example embodiments, the input includes data bits that are to be included in the physical layer protocol (PHY) payload (e.g., the PHY service data unit (PSDU) of a multi-RU physical layer protocol (PHY) data unit (PPDU)). The transmitter 118 generates a stream of OFDM symbols for inclusion in a PHY payload (e.g., PSDU) of a PPDU.

In example embodiments, the PSDU output is appended to a PHY header to provide a PPDU that is modulated onto a carrier frequency and transmitted through wireless medium 106. In this regard, FIG. 13 illustrates an example frame format that may be used for an EHT PPDU according to example embodiments. As illustrated, the PHY header appended to the PSDU may include at least the following header fields: U-SIG (universal signal) 1302 and EHT-SIG (extreme high throughput signal) 1304. In some embodiments, information about the RUs assigned to a STA, such as the RU location and the RU size, can be indicated in the EHT-SIG field of the PPDU. In other embodiments, information about the RUs assigned to a STA, such as the RU location and the RU size, can be indicated in the U-SIG field of the PPDU. For example, the EHT-SIG or U-SIG field may include station subfields for each STA 102. Each station subfield can include further subfields that specify various parameters used in communication: STA-ID that uniquely identifies the target STA, and a bit representation of the allocation of RUs to the target STA.

At a receiving STA, PSDUs can be recovered by applying a process that is largely the inverse of that done at a transmitting STA. For example, a receiving STA 102 can demodulate and decode the PHY header of a received PPDU to determine what RUs have been assigned to that STA 102. The STA 102 can then communicate using the signals on the subcarrier sets belonging to the multiple RUs assigned to that STA 102.

Resource Unit Allocation Encoding

Although the present disclosure describes methods and processes with steps in a certain order, one or more steps of the methods and processes may be omitted or altered as appropriate. One or more steps may take place in an order other than that in which they are described, as appropriate.

With reference to FIG. 15, a multi-RU allocation transmission method 1500 is provided for allocating a portion of frequency spectrum in a wireless local area network, such as an 802.11be network, in accordance with various example embodiments described herein. The method may be performed by a transmitting station or a station for allocating RUs for transmission, such as AP-STA 104, or different steps of the method may be performed by different electronic devices in communication with each other by a digital data link, such as a bus or communication link. In some embodiments, a processing system such as processing system 150 may perform the steps of the method. Various steps of the method 1500 may be performed in a different order from the one described, or they may be omitted in some embodiments.

The portion of frequency spectrum is a defined bandwidth of wireless spectrum, such as 20, 80, 160, 240, or 320 MHz bandwidth of unlicensed wireless spectrum used for 802.11be communication. In some examples, the portion of frequency spectrum may be a contiguous band (e.g. a single contiguous 160 MHz band), whereas in other examples the portion of frequency spectrum may comprise bandwidth split into two or more bands (e.g. a 240 MHz portion of frequency spectrum may consist of an 80 MHz band at one frequency and a 160 MHz band at another frequency).

In some embodiments, such as some embodiments used for allocating multiple large-size RUs, the portion of frequency spectrum being allocated may be an operating channel. In other embodiments, such as some embodiments used for allocating multiple small-size RUs, the portion of frequency spectrum being allocated may be a single 20 MHz band.

At step 1502, a plurality of equal-size sub-bands making up the portion of frequency spectrum are identified. This step may be performed by the communication module 180 as implemented by the processing device 152 based on network configuration instructions stored in the memory 172 of the processing system 150. In cases where large-size RUs are being allocated to a target station, the sub-bands are each 20 MHz wide, corresponding to the bandwidth for a single 242-tone RU. In cases where small-size RUs are being allocated to a target station, the sub-bands each correspond to the bandwidth for a single 26-tone RU.

At step 1504, of the plurality of sub-bands, some are identified as available and others as unavailable. Sub-bands may be unavailable because there is interference or licensed use within those sub-bands, or because they have been allocated to another station. This step may be performed by the communication module 180 as implemented by the processing device 152 based on network status information stored in the memory 172 or received over a network interface 158 of the processing system 150.

At step 1506, a bit representation is generated, representing an allocation of resource units within the portion of frequency spectrum being allocated for use by a target station in the network. This step may be performed by the communication module 180 as implemented by the processing device 152 of the processing system 150, according to encoding instructions corresponding to the various bit encoding schemes described below with reference to the first embodiment, second embodiment, and third embodiment. The bit representation consists of a plurality of binary values, each binary value indicating the availability or unavailability of one or more bands within the portion of frequency spectrum as previously identified.

At step 1508, a physical layer protocol data unit (e.g. a PPDU) is generated by the transmitter 118. The physical layer protocol data unit includes a header, and the header is generated to include the bit representation indicating the availability or unavailability of one or more sub-bands for the RUs allocated to the target station, as described above with reference to the Example Processing System. At step 1510, the transmitter 118 transmits the physical layer protocol data unit to the target station.

The target station, or another STA receiving an allocation of RUs in accordance with the encoding schemes described herein, may carry out a process that is largely the inverse of that done at a transmitting STA. With reference to FIG. 16, a multi-RU allocation reception method 1600 is provided for communicating in a wireless local area network based on a received allocation of resource units, such as an 802.11be network, in accordance with various example embodiments described herein. The method may be performed by a station, such as a STA 102, or different steps of the method may be performed by different electronic devices in communication with each other by a digital data link, such as a bus or communication link. Various steps of the method 1600 may be performed in a different order from the one described, or they may be omitted in some embodiments.

At step 1602, a physical layer protocol data unit (e.g. PPDU) is received via a receiver 146 from an RU allocating station (such as AP-STA 104) in a wireless local area network. The physical layer protocol data unit includes a header, and the header includes a bit representation indicating the availability or unavailability of one or more sub-bands or the RUs allocated to the receiving STA, as described above with reference to the Example Processing System.

At step 1604, an allocation of resource units within the portion of frequency spectrum can be identified based on the bit representation. The portion of frequency spectrum is a defined bandwidth of wireless spectrum, such as a 20, 80, 160, 240, or 320 MHz channel or band of unlicensed wireless spectrum used for 802.11be communication. The bit representation consists of a plurality of binary values, each binary value indicating the availability or unavailability of one or more equal-bandwidth spectrum sub-bands of the portion of frequency spectrum being allocated. Each resource unit corresponds to one or more of the identified available sub-bands. This step may be performed by the communication module 180 as implemented by the processing device 152 of the processing system 150, according to decoding instructions corresponding to the various bit encoding schemes described below with reference to the first embodiment, second embodiment, and third embodiment.

At step 1606, the STA communicates over the wireless local area network using one or more of the allocated resource units, using its transmitter 118 and/or receiver 146, as described above with reference to the Example Processing System.

Example bit encoding schemes will now be described for generating and decoding bit representations of RU allocations for a station in a wireless network, with reference to a first embodiment, a second embodiment, and a third embodiment.

First Embodiment—Large-Size RU Allocation #1

In a first embodiment, the bit representation generated by an RU allocating STA or transmitting STA, and/or received and decoded by a receiving STA, is applicable to cases in which multiple large-size RUs (i.e. 242-tone, 484-tone, or 996-tone RUs) are allocated to a single target STA. In this embodiment, the portion of frequency spectrum being allocated is an operating channel, each sub-band has a bandwidth of 20 MHz, and each binary value in the bit representation indicates either an unavailable sub-band or one or more contiguous available sub-bands capable of supporting a single-user large-size resource unit (SU RU).

To generate the bit representation, first, a representation complexity denoting the maximum number of RUs, N, is identified. The value of representation complexity N used for the allocation encoding scheme may be set to different values in different embodiments. For example, in some embodiments a 320 MHz operating channel may have N=8, a 240 MHz operating channel may have N=7, a 160 MHz operating channel may have N=6, and an 80 MHz operating channel may have N=4.

Second, a binary value of fixed bit length n is used to identify each unavailable sub-band or each set of available sub-bands that support a RU, in this case two bits (n=2).

Concatenated together, this results in a bit representation for the RU aggregation of N×n bits in length. It will be appreciated that a high value of representation complexity N enables a larger number of potential RU allocation configurations, at the cost of requiring a longer bit representation. In various embodiments, N may be set to a value up to the number of sub-bands: i.e., a 320 MHz operating channel may have N<=16.

In some embodiments, when the number of RUs allocated to the target station is less than N, bits representing available sub-bands and unavailable sub-bands are arranged in the leading positions and the rest of the bit positions are set to be zeros.

In the described first embodiment, the binary values used to indicate unavailable bands and available sub-bands are set out in the following table:

| Availability | Size (RU supported) | Bit representation |
|---|---|---|
| Unavailable | 20 MHz | 00 |
| Available | 20 MHz (242-tone RU) | 01 |
| Available | 40 MHz (484-tone RU) | 10 |
| Available | 80 MHz (996-tone RU) | 11 |

Thus, each two-bit binary value corresponds to an unavailable 20 MHz sub-band or the size of an available one or more contiguous 20 MHz sub-bands. The four possible binary values correspond to: an unavailable sub-band (e.g. 00); an available sub-band (e.g. 01); two consecutive available sub-bands (e.g. 10); and four consecutive available sub-bands (e.g. 11). It will be appreciated that these binary values can be arbitrarily re-arranged or re-assigned in different embodiments.

In some embodiments, two or more contiguous available sub-bands may be treated as a single portion of spectrum instead of a plurality of sub-bands: thus, a 40 MHz portion of spectrum capable of supporting a 484-tone RU may be treated as a single 40 MHz portion instead of two sub-bands, and an 80 MHz portion of spectrum capable of supporting a 996-tone RU may be treated as a single 80 MHz portion instead of four sub-bands. Similarly, in some embodiments a contiguous available 60 MHz portion of spectrum may be treated as a single 60 MHz portion instead of three sub-bands.

In FIGS. 5A-G, a 320 MHz operating channel is shown in various allocation configurations. In FIGS. 6A-G, a 240 MHz operating channel is shown in various allocation configurations. In FIGS. 7A-F, a 160 MHz operating channel is shown in various allocation configurations. And in FIGS. 8A-B, an 80 MHz operating channel is shown in various allocation configurations. In each case, the operating channel consists of one to four sub-blocks of the operating channel, each sub-block of the operating channel consisting of four consecutive 20 MHz sub-bands.

The bit representations shown in each figure consists of, for each 80 MHz sub-block of the operating channel, a corresponding sub-block of the operating channel representation, each sub-block of the operating channel representation consisting of one or more binary values. Thus, available and unavailable sub-bands are designated for each 80 MHz sub-block of the operating channel separately.

According to an example aspect of the first embodiment, interpretation rules may be applied to the encoding and decoding scheme to improve compatibility. An unavailable 20 MHz sub-band may not cross the 20 or 40 MHz boundaries within a given sub-block of the operating channel, or the 80 MHz boundary between sub-blocks of the operating channel. An unavailable 40 MHz, 60 MHz, or 80 MHz of spectrum (i.e. two, three, or four contiguous 20 MHz sub-bands) may not cross the 80 MHz boundary between sub-blocks of the operating channel.

Various examples of bit representations for various RU allocations according to the first embodiment are shown in FIGS. 5A-G, 6A-G, 7A-F, and 8A-B.

Figure 5A:
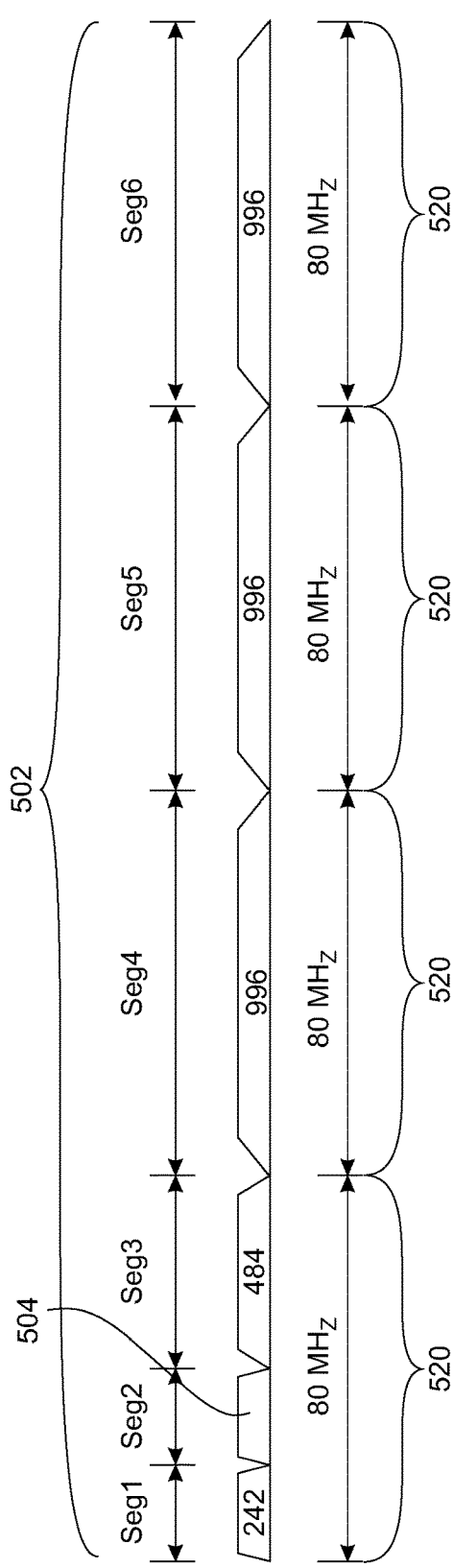
FIG. 5A illustrates an RU allocation configuration of a 320 MHz operating channel including a single unavailable 20 MHz sub-band in accordance with a first embodiment of the present disclosure.

FIG. 5A illustrates an allocation configuration of a 320 MHz operating channel 502 including a single unavailable 20 MHz sub-band 504. The 320 MHz operating channel 502 is shown as being made up of four 80 MHz sub-blocks 520. The bit representation for this RU allocation configuration is 16 bits: 0100101111110000.

Figure 5B:
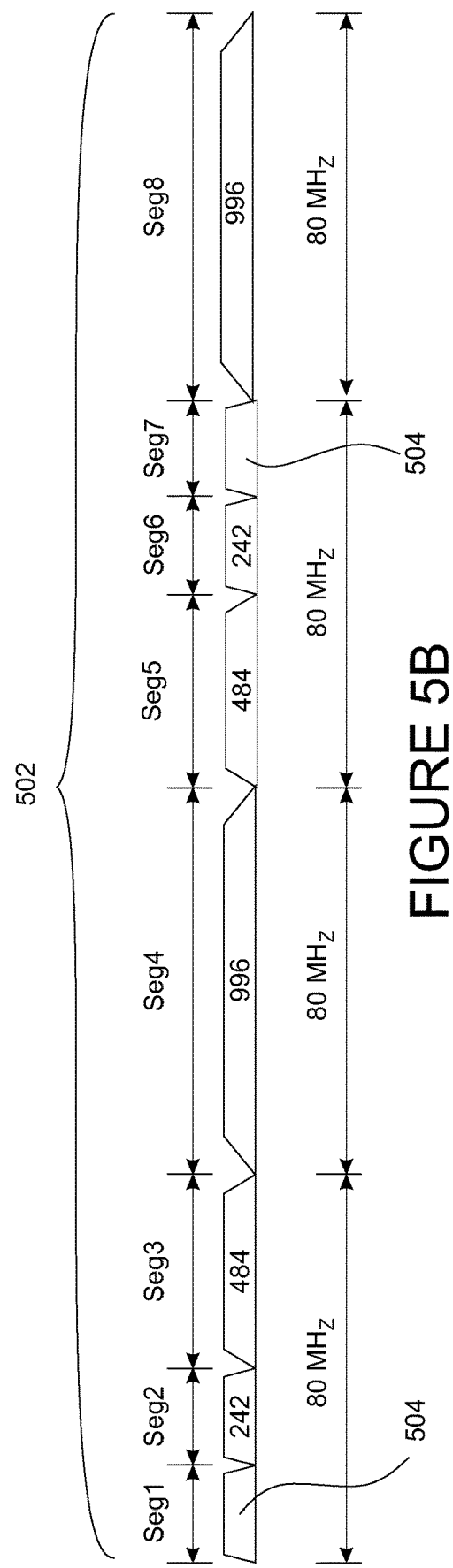
FIG. 5B illustrates an RU allocation configuration of a 320 MHz operating channel including two unavailable 20 MHz sub-bands in accordance with the first embodiment of the present disclosure.

FIG. 5B illustrates an RU allocation configuration of a 320 MHz operating channel 502 including two unavailable 20 MHz sub-bands 504. The bit representation for this RU allocation configuration is 16 bits: 0001101110010011.

Figure 5C:
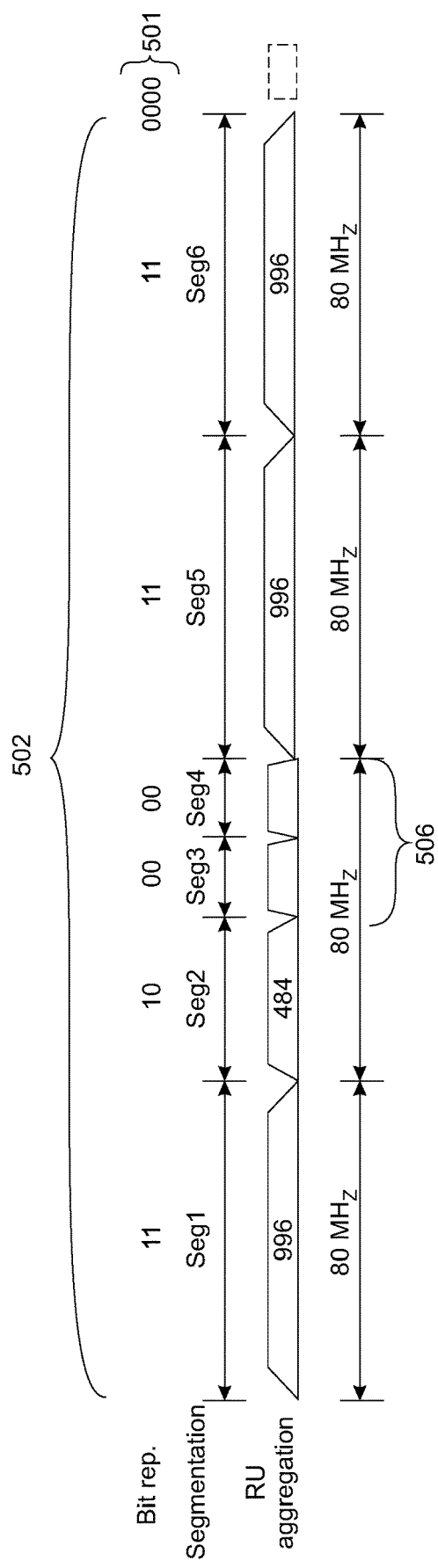
FIG. 5C illustrates an RU allocation configuration of a 320 MHz operating channel including one unavailable 40 MHz sub-band in accordance with the first embodiment of the present disclosure.

FIG. 5C illustrates an RU allocation configuration of a 320 MHz operating channel 502 including one unavailable 40 MHz sub-band 506. The bit representation 501 for this RU allocation configuration is 16 bits: 1110000011110000.

Figure 5D:
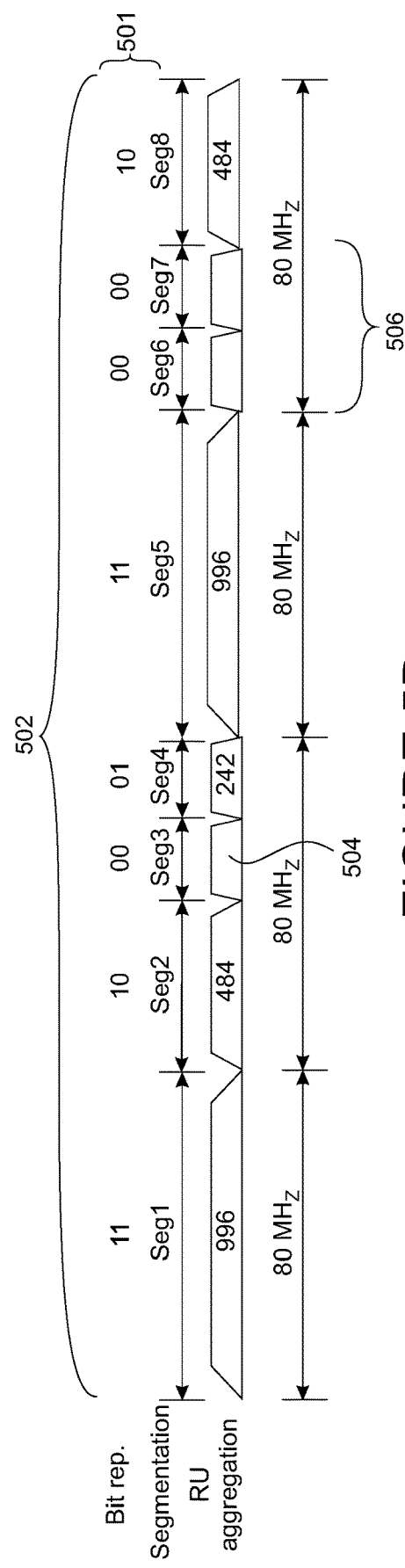
FIG. 5D illustrates an RU allocation configuration of a 320 MHz operating channel including one unavailable 20 MHz sub-band and one unavailable 40 MHz sub-band in accordance with the first embodiment of the present disclosure.

FIG. 5D illustrates an allocation configuration of a 320 MHz operating channel 502 including one unavailable 20 MHz sub-band 504 and one unavailable 40 MHz band 506 in accordance with the first embodiment of the present disclosure. The bit representation 501 for this allocation configuration is 16 bits: 1110000111000010.

Figure 5E:
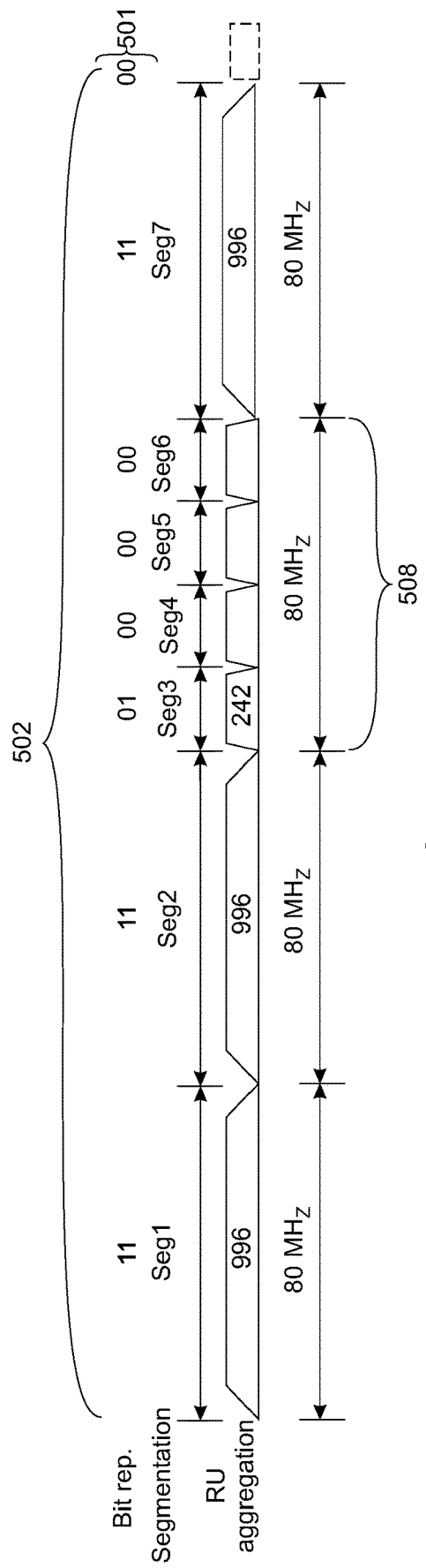
FIG. 5E illustrates an RU allocation configuration of a 320 MHz operating channel including one unavailable 60 MHz sub-band in accordance with the first embodiment of the present disclosure.

FIG. 5E illustrates an RU allocation configuration of a 320 MHz operating channel 502 including one unavailable 60 MHz band 508. The bit representation 501 for this RU allocation configuration is 16 bits: 1111010000001100.

Figure 5F:
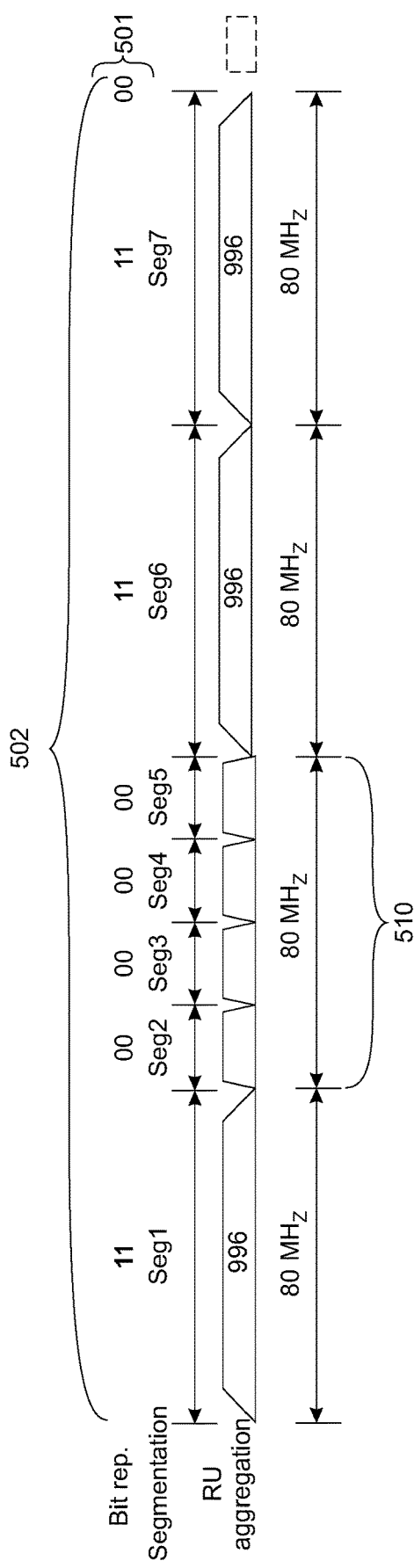
FIG. 5F illustrates an RU allocation configuration of a 320 MHz operating channel including one unavailable 80 MHz sub-band in accordance with the first embodiment of the present disclosure.

FIG. 5F illustrates an RU allocation configuration of a 320 MHz operating channel 502 including one unavailable 80 MHz band 510. The bit representation 501 for this allocation configuration is 16 bits: 1100000000111100.

Figure 5G:
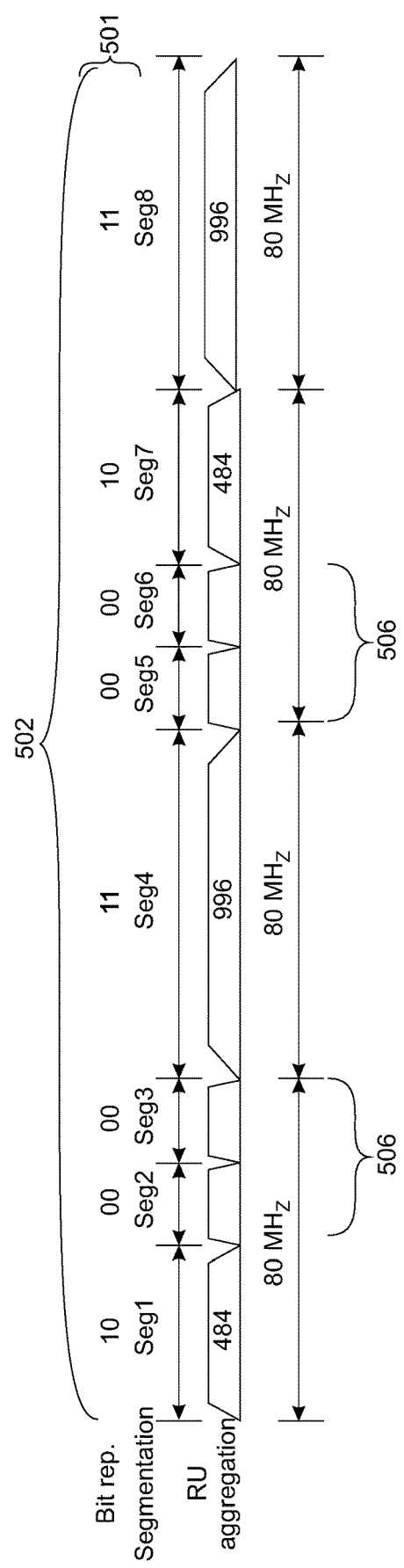
FIG. 5G illustrates an RU allocation configuration of a 320 MHz operating channel including two unavailable 40 MHz sub-bands in accordance with the first embodiment of the present disclosure.

FIG. 5G illustrates an RU allocation configuration of a 320 MHz operating channel 502 including two unavailable 40 MHz bands 506 in accordance with the first embodiment of the present disclosure. The bit representation 501 for this allocation configuration is 16 bits: 1000001100001011.

The table below summarizes the various 320 MHz operating channel RU allocation configurations described above with reference to FIGS. 5A-G, all of which are supported by the first embodiment:

| Total Bandwidth Allocated | RUs aggregated (tone sizes) | Unavailable sub-bands | Support in first embodiment |
|---|---|---|---|
| 300 (160 + 140) | 242 + 484 + 996 + 996 | One 20 MHz band | Supported using >= 12 bits |
| 280 (160 + 120) | 484 + 996 + 996 + 996 | One 40 MHz band | Supported using >= 12 bits |
| 280 (140 + 140) | 242 + 242 + 484 + 484 + 996 + 996 | Two bands of 20 MHz each | Supported using >= 16 bits |
| 260 (140 + 120) | 242 + 484 + 484 + 996 + 996 | Two bands of 20 MHz and 40 MHz | Supported using >= 16 bits |
| 260 (160 + 100) | 242 + 996 + 996 + 996 | One 60 MHz band | Supported using >= 14 bits |
| 240 (160 + 80) | 996 + 996 + 996 | One 80 MHz band | Supported using >= 14 bits |
| 240 (120 + 120) | 484 + 484 + 996 + 996 | Two bands: 40 MHz each | Supported using >= 16 bits |

FIG. 6A illustrates an RU allocation configuration of a 240 MHz operating channel 602 including a single unavailable 20 MHz sub-band 504. The bit representation 501 for this allocation configuration is 14 bits: 01001011110000.

FIG. 6B illustrates an RU allocation configuration of a 240 MHz operating channel 602 including two unavailable 20 MHz sub-bands 504. The bit representation 501 for this allocation configuration is 14 bits: 00011011010010.

FIG. 6C illustrates an RU allocation configuration of a 240 MHz operating channel 602 including one unavailable 40 MHz sub-band 506. The bit representation 501 for this allocation configuration is 14 bits: 11100000110000.

FIG. 6D illustrates an RU allocation configuration of a 240 MHz operating channel 602 including one unavailable 20 MHz sub-band 504 and one unavailable 40 MHz sub-band 506. The bit representation 501 for this allocation configuration is 14 bits: 11100001000010.

FIG. 6E illustrates an RU allocation configuration of a 240 MHz operating channel 602 including one unavailable 60 MHz sub-band 508. The bit representation 501 for this allocation configuration is 14 bits: 11110100000000.

FIG. 6F illustrates an RU allocation configuration of a 240 MHz operating channel 602 including one unavailable 80 MHz sub-band 510. The bit representation 501 for this RU allocation configuration is 14 bits: 11000000001100.

FIG. 6G illustrates an RU allocation configuration of a 240 MHz operating channel 602 including two unavailable 40 MHz sub-bands 506. The bit representation 501 for this RU allocation configuration is 14 bits: 10000011000010.

The table below summarizes the various 240 MHz operating channel RU allocation configurations described above with reference to FIGS. 6A-G, all of which are supported by the first embodiment:

| Total Bandwidth Allocated | RUs aggregated (tone sizes) | Unavailable sub-bands | Support in first embodiment |
|---|---|---|---|
| 220 (140 + 80) | 242 + 484 + 996 + 996 | One 20 MHz band | Supported using >= 10 bits |
| 200 (120 + 80/ 160 + 40) | 484 + 996 + 996 | One 40 MHz band | Supported using >= 10 bits |
| 200 (140 + 60) | 242 + 484 + 242 + 484 + 996 | Two bands of 20 MHz each | Supported using >= 14 bits |
| 180 (120 + 60/ 140 + 40) | 242 + 484 + 484 + 996 | Two bands: 40 MHz and 20 MHz | Supported using >= 14 bits |
| 180 (160 + 20/ 100 + 80) | 242 + 996 + 996 | One band of 60 MHz | Supported using >= 12 bits |
| 160 (120 + 40) | 484 + 484 + 996 | Two bands: 40 + 40 MHz | Supported using >= 14 bits |
| 160 (80 + 80) | 996 + 996 | One band of 80 MHz | Supported using >= 14 bits |

FIG. 7A illustrates an RU allocation configuration of a 160 MHz operating channel 702 including a single unavailable 20 MHz sub-band 504. The bit representation 501 for this RU allocation configuration is 12 bits: 010010110000.

FIG. 7B illustrates an RU allocation configuration of a 160 MHz operating channel 702 including two unavailable 20 MHz sub-bands 504. The bit representation 501 for this allocation configuration is 12 bits: 000110010010.

FIG. 7C illustrates an RU allocation configuration of a 160 MHz operating channel 702 including one unavailable 40 MHz sub-band 506. The bit representation 501 for this RU allocation configuration is 12 bits: 111000000000.

FIG. 7D illustrates an RU allocation configuration of a 160 MHz operating channel 702 including one unavailable 20 MHz sub-band 504 and one unavailable 40 MHz sub-band 506. The bit representation 501 for this RU allocation configuration is 12 bits: 100001000010.

FIG. 7E illustrates an RU allocation configuration of a 160 MHz operating channel 702 including one unavailable 60 MHz sub-band 508. The bit representation 501 for this RU allocation configuration is 12 bits: 110100000000.

FIG. 7F illustrates an RU allocation configuration of a 160 MHz operating channel 702 including two unavailable 40 MHz sub-bands 506. The bit representation 501 for this RU allocation configuration is 12 bits: 100000000010.

The table below summarizes the various 160 MHz operating channel RU allocation configurations described above with reference to FIGS. 7A-F, all of which are supported by the first embodiment:

| Total Bandwidth Allocated | RUs aggregated (tone sizes) | Unavailable sub-bands | Support in first embodiment |
|---|---|---|---|
| 140 (60 + 80) | 242 + 484 + 996 | One 20 MHz band | Supported using >= 8 bits |
| 120 (40 + 80) | 484 + 996 | One 40 MHz band | Supported using >= 10 bits |
| 120 (60 + 60) | 242 + 484 + 242 + 484 | Two bands of 20 MHz each | Supported using >= 12 bits |
| 100 (40 + 60) | 484 + 242 + 484 | Two bands: 40 MHz and 20 MHz | Supported using >= 12 bits |
| 100 (20 + 80) | 242 + 996 | One band of 60 MHz | Supported using >= 10 bits |
| 80 (40 + 40) | 484 + 484 | Two bands: 40 + 40 MHz | Supported using >= 12 bits |

FIG. 8A illustrates an RU allocation configuration of an 80 MHz operating channel 802 including a single unavailable 20 MHz sub-band 504. The bit representation 501 for this RU allocation configuration is 8 bits: 01001000.

FIG. 8B illustrates an allocation configuration of an 80 MHz operating channel 802 including two unavailable 20 MHz bands 504. The bit representation 501 for this allocation configuration is 8 bits: 01000001.

The table below summarizes the various 80 MHz operating channel RU allocation configurations described above with reference to FIGS. 8A-B, all of which are supported by the first embodiment:

| Total Bandwidth Allocated | RUs aggregated (tone sizes) | Unavailable sub-bands | Support in first embodiment |
|---|---|---|---|
| 60 (20 + 40) | 242 + 484 | One 20 MHz band | Supported using >= 6 bits |
| 40 (20 + 20) | 242 + 242 | Two bands of 20 MHz each | Supported using >= 8 bits |

Second Embodiment—Large-Size RU Allocation #2

In a second embodiment, as in the first embodiment, the portion of frequency spectrum being allocated is an operating channel, the bit representation is applicable to cases in which multiple large-size RUs are allocated to a single target STA, and each sub-band has a bandwidth of 20 MHz. However, in the second embodiment, each binary value is one bit, and each binary value corresponds to an unavailable 20 MHz sub-band or an available 20 MHz sub-band.

Concatenated together, this results in a bitmap bit representation for the RU aggregation of a bit length equal to the number of 20 MHz sub-bands in the operating channel. Thus, for example, a 320 MHz operating channel can be allocated using a bit representation of 16 bits in length, whereas a 160 MHz operating channel can be allocated using a bit representation of 8 bits in length.

In the described second embodiment, a binary value of "0" indicates an unavailable 20 MHz sub-band, and a binary value of "1" indicates an available 20 MHz sub-band. It will be appreciated that these binary values can be arbitrarily reversed in different embodiments.

In FIGS. 9A-B, a 320 MHz operating channel 902 is shown in two RU allocation configurations. In each case, the operating channel consists of four sub-blocks of the operating channel, each sub-block of the operating channel consisting of four consecutive 20 MHz sub-bands. However, it will be appreciated that the second embodiment is equally applicable to operating channels of arbitrary size, e.g. 240 MHz, 160 MHz, or 80 MHz.

According to an example aspect of the second embodiment, interpretation rules may be applied to the encoding and decoding scheme to improve compatibility. An unavailable 20 MHz sub-band may not cross the 20 or 40 MHz boundaries within a given sub-block of the operating channel, or the 80 MHz boundary between sub-blocks of the operating channel. An unavailable 40 MHz, 60 MHz, or 80 MHz portion of spectrum (i.e. two, three, or four contiguous 20 MHz sub-bands) may not cross the 80 MHz boundary between sub-blocks of the operating channel. Furthermore, two contiguous available 20 MHz sub-bands (i.e. a 40 MHz portion of spectrum that can support a 484-tone RU) may not cross the 40 MHz boundary within a given sub-block of the operating channel.

Two examples of bit representations for RU allocations according to the second embodiment are shown in FIGS. 9A-B. It will be appreciated that the bitmap bit representation of the second embodiment may be used to encode arbitrary RU allocation configurations of arbitrarily sized operating channels.

FIG. 9A illustrates an RU allocation configuration of a 320 MHz operating channel 902 including a single unavailable 20 MHz sub-band 504. The bit representation 501 for this RU allocation configuration is 16 bits: 1011111111111111.

FIG. 9B illustrates an RU allocation configuration of a 320 MHz operating channel 902 including two unavailable 20 MHz sub-bands 504. The bit representation 501 for this RU allocation configuration is 16 bits: 0111111111101111.

Third Embodiment—Small-Size RU Allocation

In 802.11ax, RU allocation for small-size RUs (26-, 52- and 106-tone) is specified per 20 MHz band. Thus, multi-RU aggregation of small-size RUs can also be indicated per 20 MHz band, i.e., a multi-RU allocation scheme for 802.11be may operate with the constraint that multiple RUs cannot be combined across 20 MHz band boundaries. Therefore, multi-RU aggregation for any operating channel with bandwidth larger than 20 MHz can be defined as a concatenation of a separate RU aggregation configuration for each individual 20 MHz band in the larger operating channel.

In a third embodiment, the bit representation is applicable to cases in which multiple small-size RUs are allocated to a single target STA, and the portion of frequency spectrum being allocated is a 20 MHz band. As in the second embodiment, each binary value is one bit, and each binary value corresponds to an unavailable sub-band or an available sub-band. However, in the third embodiment, each one-bit binary value corresponds to a sub-band with the bandwidth for a 26-tone RU, with nine such sub-bands making up the 20 MHz band.

With reference to the drawings, FIG. 10 illustrates several example RU sizes and corresponding allocation bit representations 501 for small-size resource units of a 20 MHz band 1002 in accordance with a first aspect of the third embodiment. Nine sub-bands are shown, with three example RU sets of RUs: at the top 1004, a 26-tone RU is shown in each sub-band; in the middle 1006, a 26-tone RU is shown in the middle (fifth) sub-band, flanked on the left and right by two pairs of 52-tone RUs; and at the bottom 1008, a 26-tone RU is shown in the fifth sub-band, flanked on the left and right by two 106-tone RUs.

Thus, in the first aspect of the third embodiment shown in FIG. 10, the 20 MHz band is allocated using a bitmap bit representation of 9 bits (b0, . . . , b8) to indicate the RU allocation configuration. A binary value of 0 for a given bit (e.g. b0) indicates that the corresponding sub-band (e.g. the first sub-band on the left) is unavailable. A binary value of 1 for a given bit (e.g. b1) indicates that the corresponding sub-band (e.g. the second sub-band from the left) is available. It will be appreciated that these bit values could be reversed in some embodiments.

Interpretation rules may be applied to the encoding and decoding scheme of the third embodiment to improve compatibility and resolve ambiguities. Reading from the left, if four adjacent bits (e.g. b0 through b3) are encountered that are all coded as available (b0b1b2b3=1111), this indicates a 106-tone RU spanning those four sub-bands. Similarly, if two adjacent bits (e.g. b1 and b2) are encountered that are both coded as available (b1b2=11), this indicates a 52-tone RU spanning those two sub-bands.

In some embodiments, to increase compatibility, the fifth sub-band cannot be used by a 52- or 106-tone RU: the fifth bit (b4) therefore either indicates an unavailable sub-band (b4=0) or a single available sub-band supporting a 26-tone RU (b4=1). In some embodiments, the encoding and decoding of the allocation bit representation will resolve ambiguities by assuming allocation of the largest available RU as bits or sub-bands are analyzed, starting from the left. Combining these two features, a bit representation of 111111101 would be coded as a 106-tone RU (1111), followed by a 26-tone RU (1) using the fifth sub-band, followed by a 52-tone RU (11), followed by an unavailable sub-band (0), followed by a 26-tone RU (1). It will be appreciated that these rules could be altered in some embodiments: the rule could be applied starting from the right side, or with some other priority or sequencing of the bit or band analysis, or different assumptions could be made about the conditions under which 106-, 52-, or 26-tone RUs are allocated to which sub-bands.

FIGS. 12A-E show example allocations of multiple small-size RUs within a 20 MHz band 1002 according to the first aspect of the third embodiment described above.

FIG. 12A illustrates an allocation configuration for small-size resource units of a 20 MHz band 1002 including two available sub-bands capable of supporting 26-tone resource units 1022. The bit representation 501 for this allocation configuration is 9 bits: 010001000.

FIG. 12B illustrates an allocation configuration for small-size resource units of a 20 MHz band 1002 including five available sub-bands capable of supporting 26-tone resource units 1022. The bit representation 501 for this allocation configuration is 9 bits: 101010101.

FIG. 12C illustrates an allocation configuration for small-size resource units of a 20 MHz band 1002 including two available sub-bands capable of supporting 26-tone resource units 1022 and two pairs of available sub-bands capable of supporting 52-tone resource units 1024. The bit representation 501 for this allocation configuration is 9 bits: 011101110.

FIG. 12D illustrates an allocation configuration for small-size resource units of a 20 MHz band 1002 including one available sub-bands capable of supporting 26-tone resource representation 501 1022 and one set of four sub-bands capable of supporting an available 106-tone resource unit 1026. The bit representation for this allocation configuration is 9 bits: 111110000.

FIG. 12E illustrates an allocation configuration for small-size resource units of a 40 MHz band 1002 including four available sub-bands capable of supporting 26-tone resource units 1022 and four pairs of available sub-bands capable of supporting 52-tone resource units 1024. The bit representation 501 for this allocation configuration is 18 bits: 011101011; 110101110 (representing a band spanning two 20 MHz spectrum bands).

In a second aspect, the third embodiment may use an encoding scheme wherein the fifth sub-band in order by frequency is not available for allocation. According to this aspect, the bit representation has eight bits instead of nine, as the availability or unavailability of the fifth sub-band does not need to be represented in the bit representation. The binary values and constraints imposed in the second aspect of the third embodiment may be identical to those described for the first aspect of the third embodiments above.

FIG. 11 illustrates several example RU sizes and corresponding allocation bit representations 501 for small-size resource units of a 20 MHz band 1002 in accordance with a second aspect of the third embodiment. Eight sub-bands are shown in addition to the immutably unavailable fifth sub-band 1010. Three example RU allocations are shown: at the top 1004, a 26-tone RU is allocated to each sub-band; in the middle 1006, two pairs of 52-tone RUs are allocated; and at the bottom 1008, two 106-tone RUs are allocated.

The example allocation configurations of FIGS. 12A, 12C, 12E are supported by the second aspect of the third embodiment. The bit representation for the allocation configuration of FIG. 12A is 8 bits: 01001000. The bit representation for the allocation configuration of FIG. 12C is 8 bits: 01111110. The bit representation for the allocation configuration of FIG. 12E is 16 bits: 01111011; 11011110.

PHY Data Unit Header Encoding

In some embodiments, the bit representation may be included in a header of the physical layer protocol (PHY) data unit (PPDU). FIG. 13 illustrates an example physical layer protocol data unit format for exchanging information through a wireless medium of the communication network of FIG. 4. The header includes a universal signal (U-SIG) field 1302 and an extreme high throughput signal (EHT-SIG) field 1304. In some embodiments, the bit representation for availability of sub-bands in each separated 80 MHz sub-block of the operating channel or RU allocation is included in the universal signal field 1302. In some embodiments, the bit representation for availability of sub-bands in each separated 80 MHz sub-block of the operating channel or RU allocation is included in the extreme high throughput signal field 1304. Generating, transmitting, receiving, and decoding the PPDU and its header are described in the Example Processing System section above.

General

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims. It will be appreciated that two or more of the various embodiments, aspects, and examples described herein may be combined in a single system, device, or method that supports and implements the various configurations described herein as appropriate in a given context.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of allocating a portion of frequency spectrum in a wireless local area network, comprising:
generating a bit representation comprising an ordered set of binary numbers corresponding to an ordered set of equal-size sub-bands of the portion of frequency spectrum, each successive binary number in the ordered set of binary numbers having a fixed number of digits and indicating the availability or unavailability of one or more successive sub-bands of the ordered set of equal-size sub-bands;
generating a physical layer protocol data unit, the physical layer protocol data unit comprising a header, the header comprising the bit representation; and
transmitting the physical layer protocol data unit to a target station.

2. The method of claim 1, wherein:
the portion of frequency spectrum being allocated is an operating channel;
each sub-band has a bandwidth of 20 MHz; and
each binary number indicates an unavailable sub-band or one or more available sub-bands.

3. The method of claim 2, wherein:
the operating channel consists of one to four sub-blocks of the operating channel, each sub-block of the operating channel consisting of four 20 MHz sub-bands; and
the bit representation consists of, for each sub-block of the operating channel, a corresponding sub-block representation, each sub-block representation consisting of one or more binary numbers.

4. The method of claim 3, wherein:
each binary number is two bits; and
each binary number corresponds to an unavailable 20 MHz sub-band or the size of an available one or more contiguous 20 MHz sub-bands.

5. The method of claim 4, wherein:
the four possible binary numbers correspond to:
an unavailable sub-band;
an available sub-band;
two contiguous available sub-bands; and
four contiguous available sub-bands.

6. The method of claim 3, wherein:
each binary number is one bit; and
each binary number corresponds to an unavailable 20 MHz sub-band or an available 20 MHz sub-band.

7. The method of claim 6, wherein:
a binary number of "0" indicates an unavailable 20 MHz sub-band; and
a binary number of "1" indicates an available 20 MHz sub-band.

8. The method of claim 3, wherein:
the header includes a universal signal field; and
the bit representation is included in the universal signal field.

9. The method of claim 3, wherein:
the header includes an extreme high throughput signal field; and
the bit representation is included in the extreme high throughput signal field.

10. A method, comprising:
receiving, over a wireless local area network, a physical layer protocol data unit, the physical layer protocol data unit comprising a header, the header comprising a bit representation;
identifying the availability of sub-bands to which resource units can be allocated within a portion of frequency spectrum based on the bit representation, the bit representation consisting of an ordered set of binary numbers, each binary number having a fixed number of digits and indicating the availability or unavailability of one or more successive equal-size sub-bands of an ordered set of equal-size sub-bands making up the portion of frequency spectrum; and
communicating over the wireless local area network using one or more of the available sub-bands.

11. The method of claim 10, wherein:
the portion of frequency spectrum being allocated is an operating channel;
each sub-band has a bandwidth of 20 MHz; and
each binary number indicates an unavailable sub-band or one or more available sub-bands capable of supporting a single-user resource unit.

12. The method of claim 11, wherein:
the operating channel consists of one to four sub-blocks of the operating channels, each sub-block of the operating channel consisting of four sub-bands; and
the bit representation comprises, for each sub-block of the operating channel, a corresponding sub-block representation, each sub-block representation consisting of one or more binary numbers.

13. The method of claim 12, wherein:
each binary number is two bits; and
each binary number corresponds to an unavailable 20 MHz sub-band or the size of one or more contiguous available 20 MHz sub-bands.

14. The method of claim 13, wherein:
the four possible binary numbers correspond to:
an unavailable sub-band;
an available sub-band;
two contiguous available sub-bands; and
four contiguous available sub-bands.

15. The method of claim 12, wherein:
each bit of the bit representation corresponds to an unavailable sub-band or an available sub-band.

16. The method of claim 15, wherein:
a binary number of "0" indicates an unavailable 20 MHz sub-band; and
a binary number of "1" indicates an available 20 MHz sub-band.

17. The method of claim 12, wherein:
the header includes a universal signal field; and
the bit representation is included in the universal signal field.

18. The method of claim 12, wherein:
the header includes an extreme high throughput signal field; and
the bit representation is included in the extreme high throughput signal field.

19. A station enabled for use in a wireless area local area network (WLAN), the station being configured to perform the method of claim 1.

20. A processing system, comprising:
a processing device;
a wireless network interface for wireless communication with a network; and
a memory,
the memory having stored thereon executable instructions that, when executed by the processing device, implement a communication module configured to perform the method of claim 10 using the wireless network interface.

21. The processing system of claim 20, wherein:
the portion of frequency spectrum being allocated is an operating channel;
each sub-band has a bandwidth of 20 MHz; and
each binary number indicates an unavailable sub-band or one or more available sub-bands.

22. The processing system of claim 21, wherein:
the operating channel consists of one to four sub-blocks of the operating channel, each sub-block of the operating channel consisting of four 20 MHz sub-bands; and
the bit representation consists of, for each sub-block of the operating channel, a corresponding sub-block representation, each sub-block representation consisting of one or more binary numbers.

23. The processing system of claim 22, wherein:
each binary number is one bit; and
each binary number corresponds to an unavailable 20 MHz sub-band or an available 20 MHz sub-band.

* * * * *